US006636364B2

(12) United States Patent
Sato

(10) Patent No.: US 6,636,364 B2
(45) Date of Patent: Oct. 21, 2003

(54) SINGLE-FOCUS LENS

(75) Inventor: Kenichi Sato, Saitama (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 45 days.

(21) Appl. No.: 10/008,138

(22) Filed: Oct. 22, 2001

(65) Prior Publication Data
US 2002/0048091 A1 Apr. 25, 2002

(30) Foreign Application Priority Data

Oct. 23, 2000 (JP) ......................... 2000-323186
Jan. 25, 2001 (JP) ......................... 2001-016757

(51) Int. Cl.[7] .................................................. G02B 3/04
(52) U.S. Cl. ...................... 359/713; 359/708; 359/715
(58) Field of Search ............................... 359/756–760, 359/763–769, 771–774, 780, 708, 713, 714, 715

(56) References Cited

U.S. PATENT DOCUMENTS 4,976,525 A * 12/1990 Matsumura et al. ........ 359/649
5,296,967 A * 3/1994 Moskovich ................. 359/649
6,445,513 B2 * 9/2002 Sato .......................... 359/763

FOREIGN PATENT DOCUMENTS

JP  08-152555  6/1996
JP  09-090213  4/1997

* cited by examiner

*Primary Examiner*—Scott J. Sugarman
*Assistant Examiner*—Deborah A. Raizen
(74) *Attorney, Agent, or Firm*—Frommer Lawrence & Haug; Matthew K. Ryan

(57) ABSTRACT

Provided is a single-focus lens with a shorter overall length which exhibits optimal optical performance chiefly for an imaging lens, and does not require a complicated fabrication technique. In the single-focus lens, consecutively arranged form an object side are a first lens having a meniscus shape and a positive refractive power, directing its concave to the object side; a second lens having a meniscus shape and including at least one aspheric surface; a third lens directing its concave to the object side and having a negative refractive power; a fourth lens directing its convex to an image side and having a positive refractive power; a fifth lens directing its convex to the image side and having a positive refractive power and a sixth lens having a meniscus shape, including at least one aspheric lens, and directing its concave to the image surface. Preferably, the second lens and the sixth lens are made of optical plastic.

16 Claims, 21 Drawing Sheets

| EXAMPLE 1-1 ||||||
|---|---|---|---|---|
| Si (SURFACE No.) | Ri (RADIUS OF CURVATURE) | Di (SURFACE SEPARATION) | Ndj (REFRACTIVE INDEX) | $\nu$dj (ABBE No.) |
| 1 | -1.3672 | 0.4724 | 1.84666(Nd1) | 23.8($\nu$d1) |
| 2 | -0.9135 | 0.0437 | | |
| *3 | -1.0498 | 0.2450 | 1.49020 | 57.5 |
| *4 | -1.1373 | 0.1575 | | |
| 5(STOP) | —— | 0.3412 | | |
| 6 | -0.7446 | 0.1225 | 1.92286 | 20.9($\nu$d3) |
| 7 | -5.6107 | 0.0079 | | |
| 8 | -3.7392 | 0.4374 | 1.75500 | 52.3($\nu$d4) |
| 9 | -1.0540 | 0.0175 | | |
| 10 | 4.7815 | 0.5599 | 1.58913 | 61.2 |
| 11 | -1.0152 | 0.0350 | | |
| *12 | 0.9778 | 0.4024 | 1.49020 | 57.5 |
| *13 | 0.8545 | 0.5000 | | |
| 14 | 0.0000 | 0.2275 | 1.51680 | 64.2 |
| 15 | 0.0000 | | | |

(*:ASPHERIC SURFACE)    ( f=1.00, FNo.=4.8, 2$\omega$=60.6 )

FIG. 2A

| EXAMPLE 1-1 ||||||
|---|---|---|---|---|---|
| SURFACE No. | ASPHERIC COEFFICIENT |||||
| | K | A4 | A6 | A8 | A10 |
| 3rd SURFACE | 2.7125 | -1.1818E-01 | -4.0391E+00 | -4.2792E+00 | -1.4638E+02 |
| 4th SURFACE | 1.6527 | 1.8628E-01 | -7.5237E+00 | -9.1230E+01 | -2.8260E+02 |
| 12th SURFACE | -6.4073 | 1.3811E+00 | -4.9854E+00 | 7.1284E+00 | -9.8407E+00 |
| 13th SURFACE | -4.5477 | 3.0407E+00 | -9.9696E+00 | 7.4321E+00 | 7.2855E-01 |

FIG. 2B

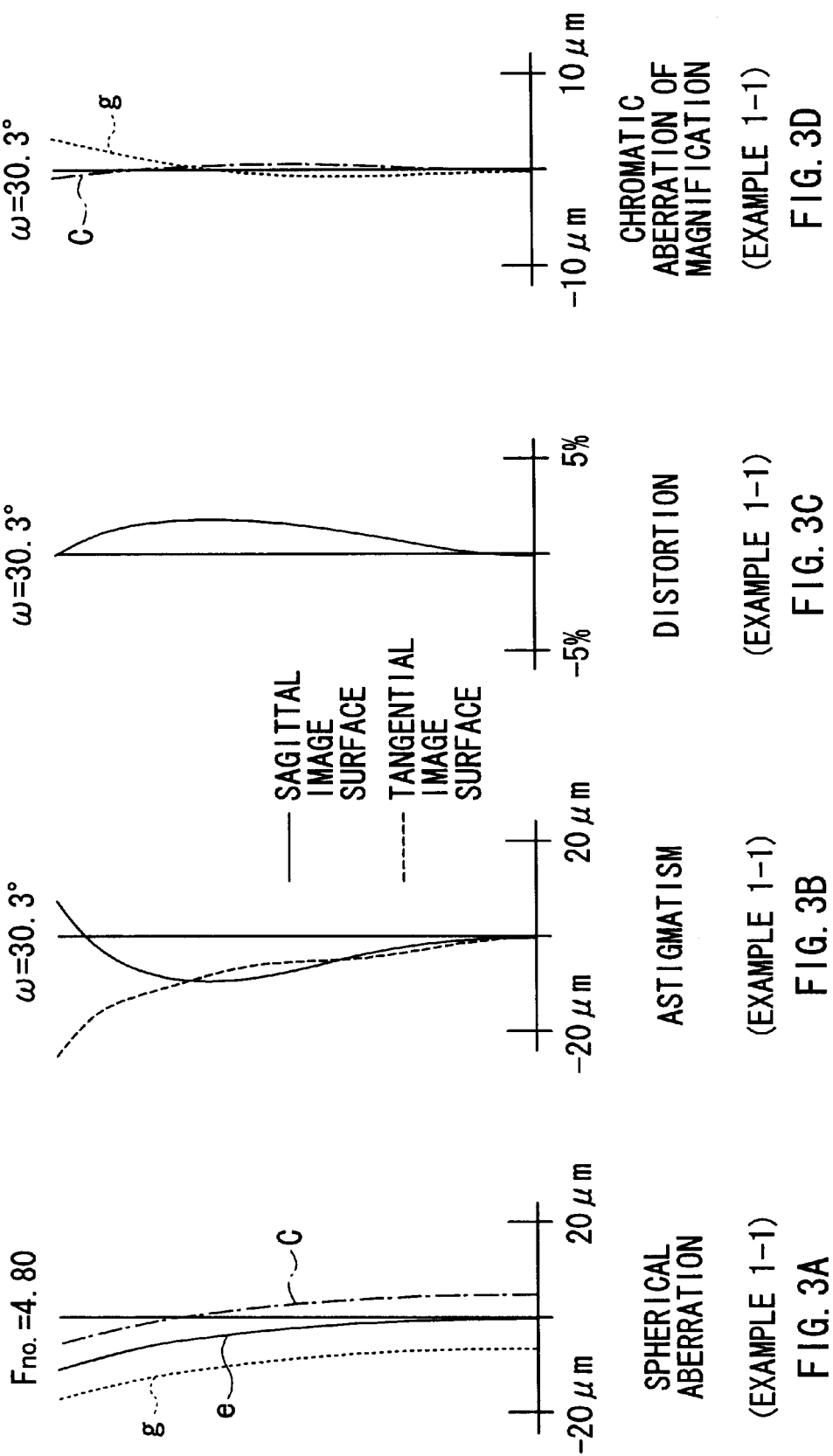

| EXAMPLE 1-2 |||||
|---|---|---|---|---|
| Si (SURFACE No.) | Ri (RADIUS OF CURVATURE) | Di (SURFACE SEPARATION) | Ndj (REFRACTIVE INDEX) | $\nu$dj (ABBE No.) |
| 1 | -1.1744 | 0.3849 | 1.92286 (Nd1) | 20.9 ($\nu$d1) |
| 2 | -0.9134 | 0.0437 | | |
| *3 | -1.0496 | 0.2449 | 1.49020 | 57.5 |
| *4 | -1.1371 | 0.1575 | | |
| 5 (STOP) | —— | 0.3411 | | |
| 6 | -0.7444 | 0.1225 | 1.92286 | 20.9 ($\nu$d3) |
| 7 | -4.7230 | 0.0175 | | |
| 8 | 5.9226 | 0.4374 | 1.75500 | 52.3 ($\nu$d4) |
| 9 | -1.0538 | 0.0175 | | |
| 10 | -4.8670 | 0.5598 | 1.58913 | 61.2 |
| 11 | -1.0150 | 0.0350 | | |
| *12 | 0.8600 | 0.4024 | 1.49020 | 57.5 |
| *13 | 0.7631 | 0.5000 | | |
| 14 | 0.0000 | 0.2274 | 1.51680 | 64.2 |
| 15 | 0.0000 | | | |

(*: ASPHERIC SURFACE)    ( f=1.00, FNo.=4.8, 2$\omega$=60.6 )

FIG. 5A

| EXAMPLE 1-2 ||||||
|---|---|---|---|---|---|
| SURFACE No. | ASPHERIC COEFFICIENT |||||
| | K | A4 | A6 | A8 | A10 |
| 3rd SURFACE | 2.5038 | 2.8222E-01 | -5.1871E+00 | -1.1294E-03 | -1.0519E+02 |
| 4th SURFACE | 1.4317 | 5.0936E-01 | -6.3077E+00 | -9.1446E+01 | -2.8708E+02 |
| 12th SURFACE | -6.4411 | 1.5867E+00 | -5.9533E+00 | 9.5430E+00 | -1.3832E+01 |
| 13th SURFACE | -4.5477 | 3.0423E+00 | -9.9782E+00 | 7.4411E+00 | 7.2968E-01 |

FIG. 5B

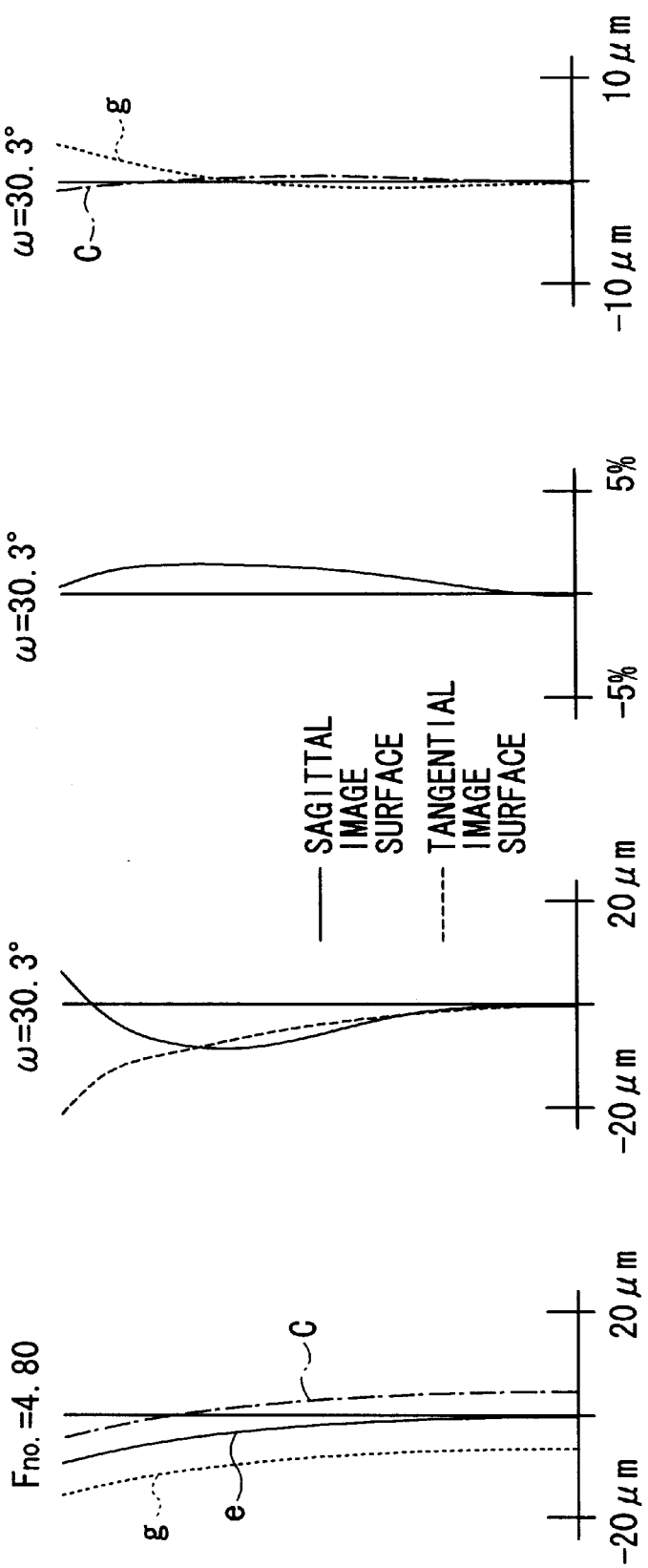
FIG. 6A (EXAMPLE 1-2) SPHERICAL ABERRATION
FIG. 6B (EXAMPLE 1-2) ASTIGMATISM
FIG. 6C (EXAMPLE 1-2) DISTORTION
FIG. 6D (EXAMPLE 1-2) CHROMATIC ABERRATION OF MAGNIFICATION

| EXAMPLE 1-3 ||||||
|---|---|---|---|---|
| Si (SURFACE No.) | Ri (RADIUS OF CURVATURE) | Di (SURFACE SEPARATION) | Ndj (REFRACTIVE INDEX) | $\nu$dj (ABBE No.) |
| 1 | -1.3664 | 0.5249 | 1.84666(Nd1) | 23.8($\nu$d1) |
| 2 | -0.9134 | 0.0437 | | |
| *3 | -1.0147 | 0.2449 | 1.49020 | 57.5 |
| *4 | -1.1022 | 0.1575 | | |
| 5(STOP) | — | 0.3412 | | |
| 6 | -0.7445 | 0.1225 | 1.92286 | 20.9($\nu$d3) |
| 7 | -5.6203 | 0.4374 | 1.75500 | 52.3($\nu$d4) |
| 8 | -1.0538 | 0.0175 | | |
| 9 | 6.9930 | 0.5598 | 1.58913 | 61.2 |
| 10 | -1.0151 | 0.0350 | | |
| *11 | 0.9955 | 0.4024 | 1.49020 | 57.5 |
| *12 | 0.8680 | 0.5000 | | |
| 13 | 0.0000 | 0.2274 | 1.51680 | 64.2 |
| 14 | 0.0000 | | | |

(*:ASPHERIC SURFACE)     ( f=1.00, FNo.=4.8, 2$\omega$=60.6 )

FIG. 8A

| EXAMPLE 1-3 ||||||
|---|---|---|---|---|---|
| SURFACE No. | ASPHERIC COEFFICIENT |||||
| | K | A4 | A6 | A8 | A10 |
| 3rd SURFACE | 2.7763 | -5.3156E-02 | -4.7518E+00 | -2.1336E+00 | -1.2223E+02 |
| 4th SURFACE | 1.6494 | 1.9489E-01 | -7.4563E+00 | -9.3099E+01 | -2.8837E+02 |
| 12th SURFACE | -6.6322 | 1.3682E+00 | -4.9950E+00 | 7.0055E+00 | -9.4077E+00 |
| 13th SURFACE | -4.5477 | 3.0418E+00 | -9.9758E+00 | 7.4386E+00 | 7.2937E-01 |

FIG. 8B

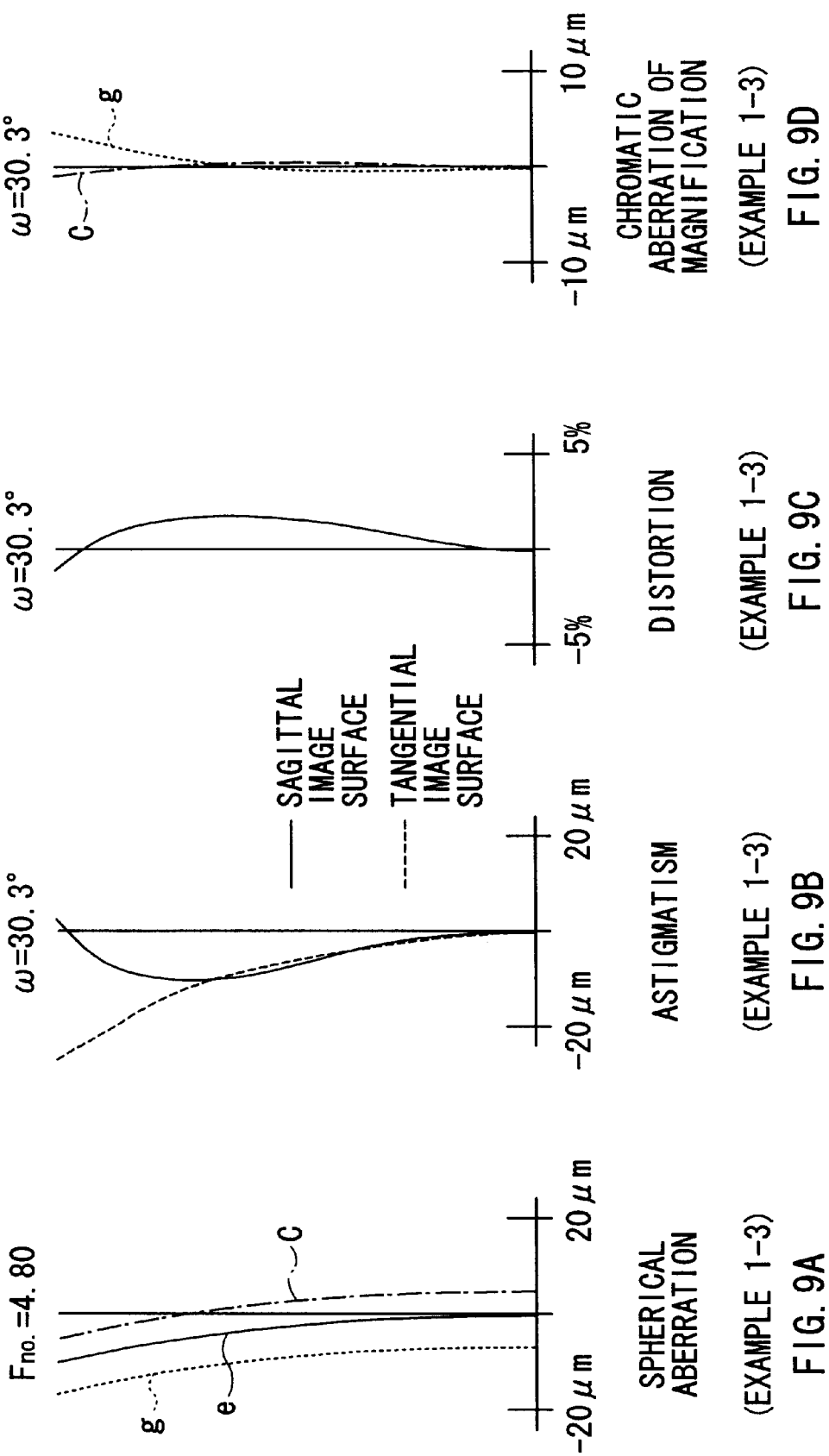

| EXAMPLES | VALUES FOR CONDITIONAL EXPRESSIONS | | | | | |
|---|---|---|---|---|---|---|
| | (1) $f/f_2$ | (2) $f/f_6$ | (3) $Nd_1$ | (4) $\nu d_1$ | (4) $\nu d_3$ | (4) $\nu d_4$ |
| EXAMPLE 1-1 | -0.003 | 0.006 | 1.84666 | 23.8 | 20.9 | 52.3 |
| EXAMPLE 1-2 | -0.003 | 0.03 | 1.92286 | 20.9 | 20.9 | 52.3 |
| EXAMPLE 1-3 | -0.003 | 0.003 | 1.84666 | 23.8 | 20.9 | 52.3 |

FIG. 10

| EXAMPLE 2-1 |||||
|---|---|---|---|---|
| Si (SURFACE No.) | Ri (RADIUS OF CURVATURE) | Di (SURFACE SEPARATION) | Ndj (REFRACTIVE INDEX) | $\nu$dj (ABBE No.) |
| 1 | 1.2672 | 0.21474 | 1.84666(Nd1) | 23.8($\nu$d1) |
| 2 | 1.7472 | 0.32888 | | |
| *3 | -0.4666 | 0.27894 | 1.49020 | 57.5 |
| *4 | -0.5653 | 0.30941 | | |
| 5 | 0.0000 | 0.15086 | | |
| 6 | -2.0764 | 0.67664 | 1.62299 | 58.1($\nu$d3) |
| 7 | -0.6013 | 0.02863 | | |
| *8 | -0.4987 | 0.17179 | 1.49020 | 57.5 |
| *9 | -0.4485 | 0.57947 | | |
| 10 | 0.0000 | 0.18610 | 1.51680 | 64.2 |
| 11 | 0.0000 | | | |

(*:ASPHERIC SURFACE)    ( f'=1.00, FNo.=5.6, 2$\omega$=51.0 )

FIG. 13A

| EXAMPLE 2-1 ||||||
|---|---|---|---|---|---|
| SURFACE No. | ASPHERIC COEFFICIENT |||||
| | K | A4 | A6 | A8 | A10 |
| 3rd SURFACE | 1.1431 | 4.9672E+00 | -4.2644E+00 | 5.1480E+00 | 1.3512E+02 |
| 4th SURFACE | -0.7219 | 2.6841E+00 | 4.7214E+00 | -1.5257E+02 | 3.9275E+02 |
| 8th SURFACE | -2.4069 | 3.1824E+00 | -1.7944E+01 | 1.0571E+01 | -3.6334E+01 |
| 9th SURFACE | -1.6567 | 4.7250E+00 | -2.6540E+01 | 1.6592E+01 | 2.6011E+01 |

FIG. 13B

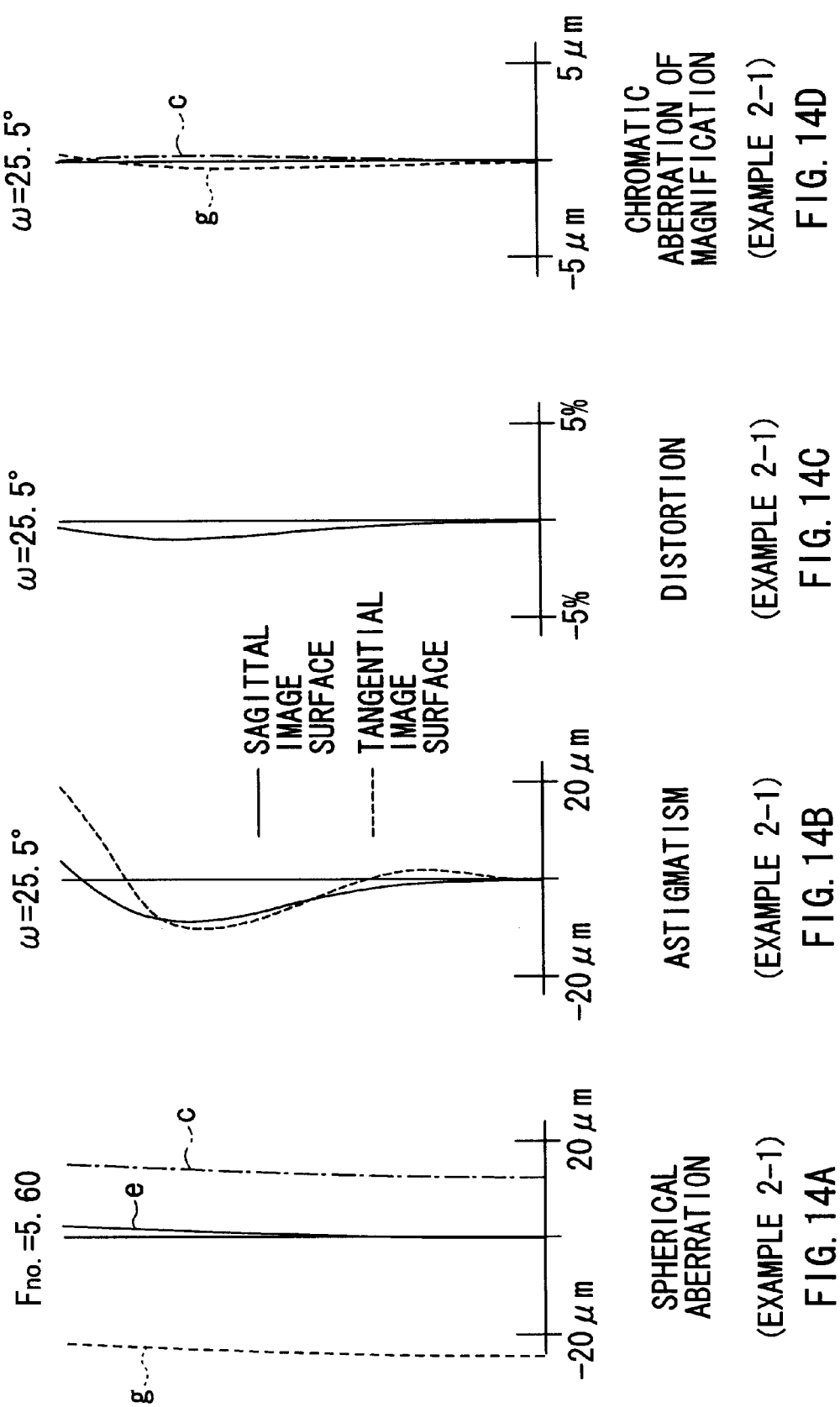

| EXAMPLE 2-2 | | | | |
|---|---|---|---|---|
| Si (SURFACE No.) | Ri (RADIUS OF CURVATURE) | Di (SURFACE SEPARATION) | Ndj (REFRACTIVE INDEX) | $\nu$dj (ABBE No.) |
| 1 | 2.5674 | 0.2150 | 1.84666(Nd1) | 23.8($\nu$d1) |
| 2 | 5.7825 | 0.3082 | | |
| *3 | -0.4069 | 0.2219 | 1.49020 | 57.5 |
| *4 | -0.4798 | 0.3690 | | |
| 5 | 0.0000 | 0.1689 | | |
| 6 | -3.7378 | 0.6776 | 1.49700 | 81.6($\nu$d3) |
| 7 | -0.5734 | 0.0287 | | |
| *8 | 0.4528 | 0.1720 | 1.49020 | 57.5 |
| *9 | 0.4111 | 0.5746 | | |
| 10 | 0.0000 | 0.1863 | 1.51680 | 64.2 |
| 11 | 0.0000 | | | |

(*:ASPHERIC SURFACE)   ( f'=1.00, FNo.=5.6, 2$\omega$=51.0 )

FIG. 16A

| EXAMPLE 2-2 | | | | | |
|---|---|---|---|---|---|
| SURFACE No. | ASPHERIC COEFFICIENT | | | | |
| | K | A4 | A6 | A8 | A10 |
| 3rd SURFACE | 0.2951 | 4.1503E+00 | -5.1000E+00 | -8.8392E+00 | 1.4042E+01 |
| 4th SURFACE | -0.5119 | 2.4710E+00 | 5.7376E+00 | -1.3369E+02 | 4.8542E+02 |
| 8th SURFACE | -2.0324 | 3.1936E+00 | -1.7525E+01 | 1.6850E+01 | -1.0366E+02 |
| 9th SURFACE | -1.5760 | 4.7443E+00 | -2.6958E+01 | 9.9370E+00 | 2.4559E+01 |

FIG. 16B

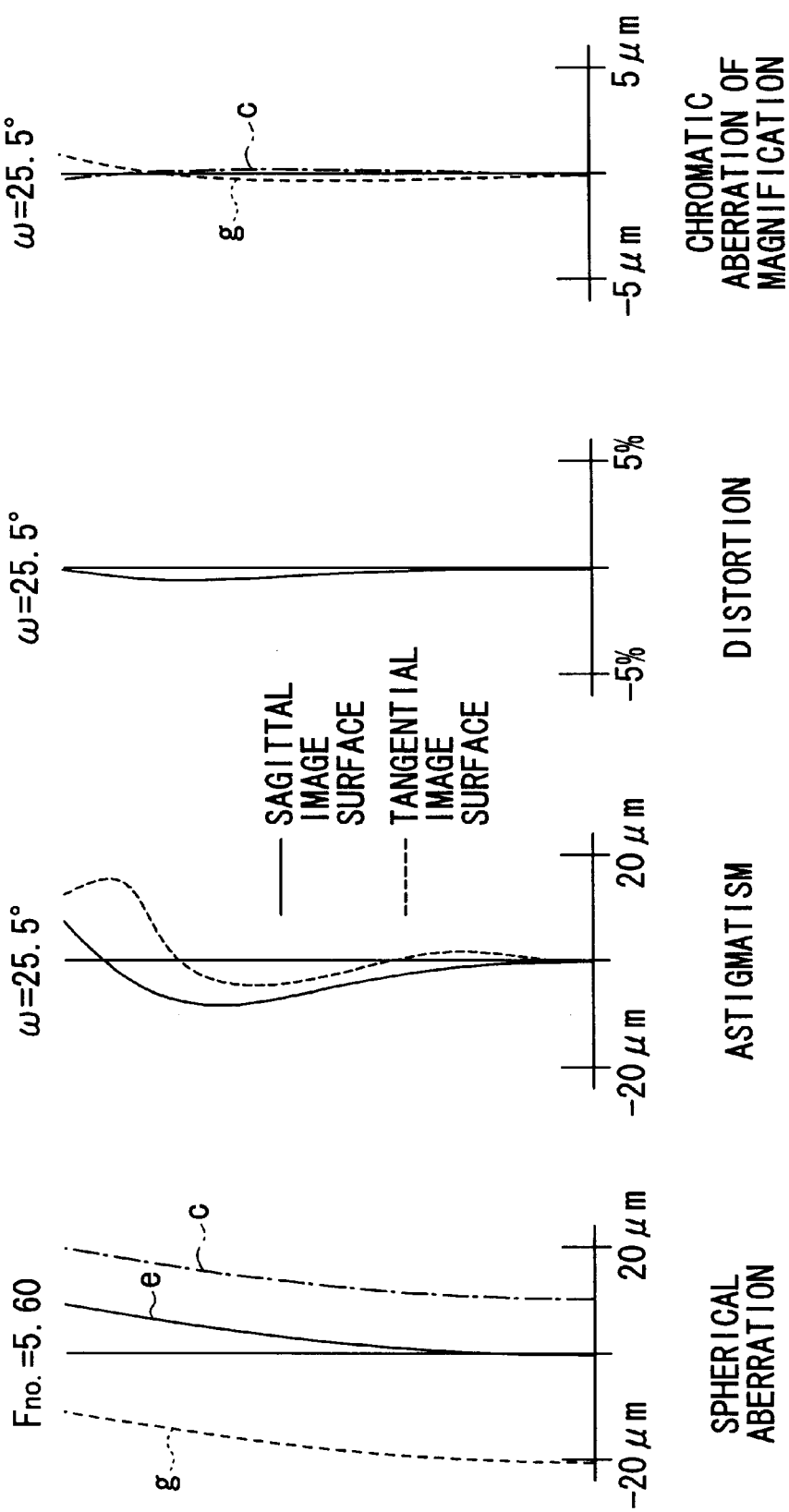

| EXAMPLE 2-3 ||||| 
|---|---|---|---|---|
| Si (SURFACE No.) | Ri (RADIUS OF CURVATURE) | Di (SURFACE SEPARATION) | Ndj (REFRACTIVE INDEX) | $\nu dj$ (ABBE No.) |
| 1 | 1.7688 | 0.2863 | 1.92286 (Nd1) | 20.9 ($\nu$d1) |
| 2 | 2.8692 | 0.3032 | | |
| *3 | -0.4554 | 0.2609 | 1.49020 | 57.5 |
| *4 | -0.5490 | 0.3055 | | |
| 5 | 0.0000 | 0.1495 | | |
| 6 | -1.9974 | 0.6768 | 1.62299 | 58.1 ($\nu$d3) |
| 7 | -0.6013 | 0.0286 | | |
| *8 | 0.4909 | 0.1718 | 1.49020 | 57.5 |
| *9 | 0.4422 | 0.5813 | | |
| 10 | 0.0000 | 0.1861 | 1.51680 | 64.2 |
| 11 | 0.0000 | | | |

(*:ASPHERIC SURFACE)   ( f'=1.00, FNo.=5.6, 2$\omega$=51.0 )

FIG. 19A

| EXAMPLE 2-3 ||||||
|---|---|---|---|---|---|
| SURFACE No. | ASPHERIC COEFFICIENT |||||
| | K | A4 | A6 | A8 | A10 |
| 3rd SURFACE | 1.0623 | 4.9632E+00 | -3.9790E+00 | 4.7533E+00 | 1.0715E+02 |
| 4th SURFACE | -0.7130 | 2.6776E+00 | 4.6555E+00 | -1.5232E+02 | 3.9745E+02 |
| 8th SURFACE | -2.3839 | 3.2042E+00 | -1.7779E+01 | 1.1027E+01 | -4.2788E+01 |
| 9th SURFACE | -1.6822 | 4.7064E+00 | -2.6674E+01 | 1.5966E+01 | 2.4711E+01 |

FIG. 19B

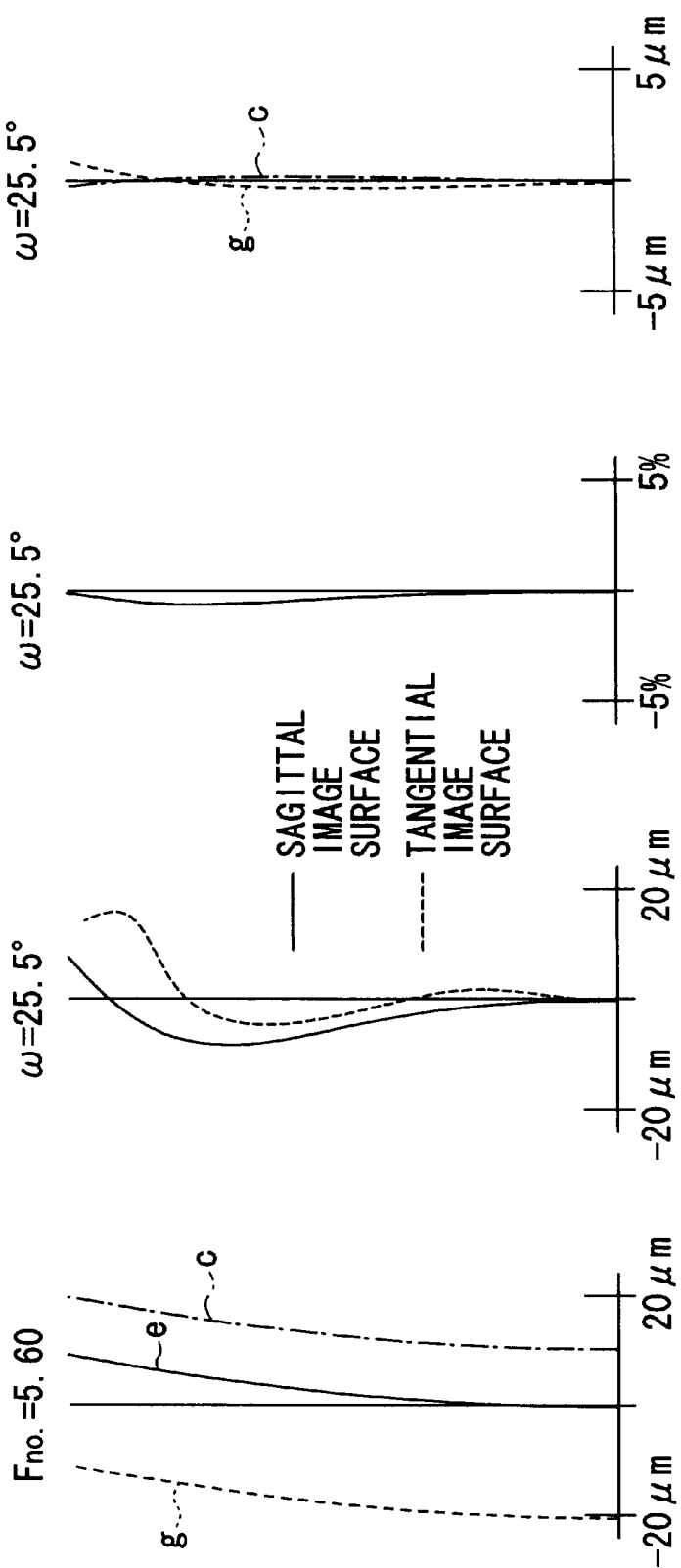

| EXAMPLES | VALUES FOR CONDITIONAL EXPRESSIONS ||||| 
|---|---|---|---|---|---|
| | (1) $f/f_2$ | (2) $f/f_4$ | (3) $Nd_1$ | (4) $\nu d_1$ | (4) $\nu d_3$ |
| EXAMPLE 2-1 | -0.012 | 0.014 | 1.84666 | 23.8 | 58.1 |
| EXAMPLE 2-2 | 0.001 | 0.040 | 1.84666 | 23.8 | 81.6 |
| EXAMPLE 2-3 | -0.015 | 0.018 | 1.92286 | 20.9 | 58.1 |

FIG. 21

SINGLE-FOCUS LENS

BACKGROUND OF THE INVENTION

1. Field of the Invention

The present invention relates to a single-focus lens, for example, used as an imaging lens in an electronic camera (digital camera).

2. Description of the Related Art

In recent years, an electronic camera which images a subject using a solid-state image sensor such as a charge-coupled device (CCD) in place of a silver-salt film has become popular. Generally, the electronic camera falls into two types: still camera and video camera. The still camera captures still pictures, whereas the video camera captures motion pictures. Imaging lenses described in Japanese Unexamined Patent Application Publication No. Hei 8-152555 and No. Hei 9-90213 are examples of conventional imaging lenses used in such electronic cameras. Japanese Unexamined Patent Application Publication No. Hei 8-152555 is directed to an imaging lens having six glass lenses. Japanese Unexamined Patent Application Publication No. Hei 9-90213 is directed to an imaging lens which comprises five lenses: four glass lenses and one plastic aspheric lens.

Now miniaturization of the electronic camera is in demand as is the camera using silver-salt films. Therefore, desirably the imaging lens for use in the electronic camera is simply constituted and downsized, having a shorter overall length. Further, desirably the imaging lens is manufactured at a low cost. Conventional imaging lenses, however, do not fully satisfy these requirements. For example, the imaging lens described in Japanese Unexamined Patent Application Publication No. Hei 8-152555 has six glass lenses. Six lenses are rather too many and the use of glass for all lenses results in high manufacturing costs. The imaging lens described in Japanese Unexamined Patent Application Publication No. Hei 9-90213 has five lenses and one of these lenses is made of plastic with the aim of cost reduction. However, its overall length is long, thus fails in downsizing.

In order to achieve reduction in the number of lenses and overall length, proposed is an imaging lens having a plurality of aspheric lenses. In this case, desirably the aspheric lenses are made of optical plastic (plastic) rather than glass in view of costs and productivity. With plastic lenses, a change in optical performance due to environmental changes such as a change in temperature or humidity is large as compared to that with glass lenses, so that it is preferred that its power be set small in order to reduce the change in optical performance. Thus, when a plurality of aspheric surfaces is used in the imaging lens, desirably the lenses are made of plastic and power is distributed appropriately considering environmental changes.

This applicant proposed a single-focus lens which exhibits preferred optical performance with a shorter overall length and a simple configuration and, is fabricated at a low cost in U.S. patent application Ser. No. 09/790,039 (Japanese Unexamined Patent Application Publication No. 2000-062991), still pending. This single-focus lens is constituted of a total of five lens elements and two lens elements thereof are plastic aspheric lenses. However, part of the lens elements of this single-focus lens is susceptible to improvement in view of fabrication process. For example, in the single-focus lens set forth in an experimental example, the fourth lens L4 made of glass is rather thick and its radius of curvature is small, which requires relatively complicated spherical surface fabrication technique.

Although the single-focus lens proposed in U.S. patent application Ser. No. 09/790,039 (Japanese Unexamined Patent Application Publication No. 2000-062991) comprises 5 lenses so that cost reduction and simple configuration are realized, the imaging lens for the electric camera requires further cost reduction and simple configuration. Imaging lenses of the known art have never fully satisfied requirements such as appropriate power distribution, simple configuration, cost reduction and shorter overall length as a whole. Particularly, the imaging lenses of the known art are susceptible to improvement in view of cost reduction.

SUMMARY OF THE INVENTION

The present invention has been achieved in view of the above problems and its first purpose is to provide a single-focus lens with a shorter overall length which exhibits optimal optical performance chiefly for imaging lenses and does not require complicated fabrication technique. Its second purpose is to provide a single-focus lens which exhibits preferable optical performance chiefly for imaging lenses and is fabricated at very low cost with a very simple configuration and a shorter overall length.

According to the single-focus lens of a first aspect of the invention, consecutively arranged from an object side are a first lens having a meniscus shape and a positive refractive power, the first lens directing its concave to the object side; a second lens having a meniscus shape and including at least one aspheric surface; a third lens directing its concave to the object side and having a negative refractive power; a fourth lens directing its convex to an image side and having a positive refractive power; a fifth lens directing its convex to the image side and having a positive refractive power; and a sixth lens having a meniscus shape, including at least one aspheric surface, and directing its concave to the image side.

According to the single-focus lens of the first aspect of the invention, principally in view of productivity of the aspheric surface, preferably the second lens and the sixth lens are made of optical plastic.

According to the single-focus lens of the first aspect of the invention, as for the second lens L2 and the sixth lens L6 which are made of optical plastic, principally in order to limit refractive power and suppress deterioration in optical performance due to environmental changes, the following conditional expressions (1) and (2) are satisfied: (1) $-0.2<f/f_2<0.2$ and (2) $-0.2<f/f_6<0.2$, where the f represents an overall focal length; the $f_2$ represents a focal length of the second lens; and the $f_6$ represents a focal length of the sixth lens.

According to the single-focus lens of the first aspect of the invention, chiefly for the purpose of correcting chromatic aberration, the following conditional expressions (3), (4), (5) and (6) are satisfied: (3) $1.70<Nd_1$, (4) $35>vd_1$, (5) $35>vd_3$, and (6) $35<vd_4$, where the $Nd_1$ represents refractive index of the first lens for a wavelength of d-line, the $vd_1$ represents Abbe number of the first lens for the wavelength of d-line, the $vd_3$ represents Abbe number of the third lens for the wavelength of d-line, and the $vd_4$ represents Abbe number of the fourth lens of the wavelength of d-line.

According to the single-focus lens of the first aspect of the invention, a plurality of aspheric lenses is employed, so that the single-focus lens can exhibit preferable optical performance with a shorter overall length and a relatively small number of lenses. Two lenses (the fourth lens and the fifth lens) similar in shape are arranged on the object side of the sixth lens. Accordingly, positive refractive power is easily divided between the two lenses.

According to the single-focus lens of a second aspect of the invention, consecutively arranged from an object side are a first lens having a meniscus shape and a positive refractive power; a second lens having a meniscus shape and at least one aspheric surface; a third lens directing its convex to an image side and having a positive refractive power; and a fourth lens having a meniscus shape, including one aspheric surface and directing its concave to the image side.

According to the single-focus lens of the second aspect of the invention, principally in view of productivity of the aspheric surface, preferably the second lens and the fourth lens are made of optical plastic.

According to the single-focus lens of the second aspect of the invention, as for the second lens L2 and the fourth lens L4 which are made of optical plastic, principally in order to limit refractive power and suppress deterioration in optical performance due to environmental changes, the following conditional expressions (11) and (12) are satisfied: (11) $-0.2<f/f_2<0.2$ and (12) $-0.2<f/f_4<0.2$, where the f represents an overall focal length; the $f_2$ represents a focal length of the second lens; and the $f_4$ represents a focal length of the fourth lens.

According to the single-focus lens of the second aspect of the invention, chiefly for the purpose of correcting chromatic aberration, the following conditional expressions (13), (14) and (15) are satisfied: (13) $1.70<Nd_1$, (14) $35>vd_1$, and (15) $50<vd_3$ where the $Nd_1$ represents refractive index of the first lens for a wavelength of d-line, the $vd_1$ represents Abbe number of the first lens for the wavelength of d-line and the $vd_3$ represents Abbe number of the third lens for the wavelength of d-line.

According to the single-focus lens of the second aspect of the invention, a plurality of aspheric lenses is employed, so that the single-focus lens can exhibit preferable optical performance with a shorter overall length and a very small number of lenses.

Other and further objects, features and advantages of the invention will appear more fully from the following description.

BRIEF DESCRIPTION OF THE DRAWINGS

FIGS. 2A and 2B are tables containing specific numerical values for a single-focus lens according to a first experimental example (Example 1-1) of the embodiment of the invention;

FIGS. 3A, 3B, 3C and 3D are aberration charts according to the single-focus lens of Example 1-1 as shown in FIGS. 2A and 2B, showing spherical aberration, astigmatism, distortion and chromatic aberration of magnification, respectively;

FIGS. 5A and 5B are tables containing specific numerical values for the single-focus lens 1A according to Example 1-2 of the embodiment of the invention;

FIGS. 6A, 6B, 6C and 6D are aberration charts according to the single-focus lens 1A of Example 1-2 as shown in FIGS. 5A and 5B, showing spherical aberration, astigmatism, distortion and chromatic aberration of magnification, respectively;

FIGS. 8A and 8B are tables containing specific numerical values of the single-focus lens 1B according to Example 1-3 of the embodiment of the invention;

FIGS. 9A, 9B, 9C and 9D are aberration charts according to the single-focus lens 1B of Example 1-3 shown in FIGS. 8A and 8C, showing spherical aberration, astigmatism, distortion and chromatic aberration of magnification;

FIG. 10 is a table showing values for conditional expressions in relation to the single-focus lenses of Examples 1-1 to 1-3;

FIGS. 13A and 13B are tables containing specific numerical values for a single-focus lens according to a first experimental example (Example 2-1) of the second embodiment of the invention;

FIGS. 14A, 14B, 14C and 14D are aberration charts according to the single-focus lens of Example 2-1 as shown in FIGS. 13A and 13B, showing spherical aberration, astigmatism, distortion and chromatic aberration of magnification, respectively;

FIGS. 16A and 16B are tables containing specific numerical values for the single-focus lens 2A according to Example 2-2 of the second embodiment of the invention;

FIGS. 17A, 17B, 17C and 17D are aberration charts according to the single-focus lens 2A of Example 2-2 as shown in FIGS. 16A and 16B, showing spherical aberration, astigmatism, distortion and chromatic aberration of magnification, respectively;

FIGS. 19A and 19B are tables containing specific numerical values of the single-focus lens 2B according to Example 2-3 of the second embodiment of the invention;

FIGS. 20A, 20B, 20C and 20D are aberration charts according to the single-focus lens 2B of Example 2-3 shown in FIGS. 19A and 19B, showing spherical aberration, astigmatism, distortion and chromatic aberration of magnification; and FIG. 21 is a table showing values for conditional expressions in relation to the single-focus lenses of Examples 2-1 to 2-3.

DETAILED DESCRIPTION OF THE PREFERRED EMBODIMENTS

Embodiments of the present invention will be described in detail below with reference to the accompanying drawings.

First Embodiment

Figure 1:
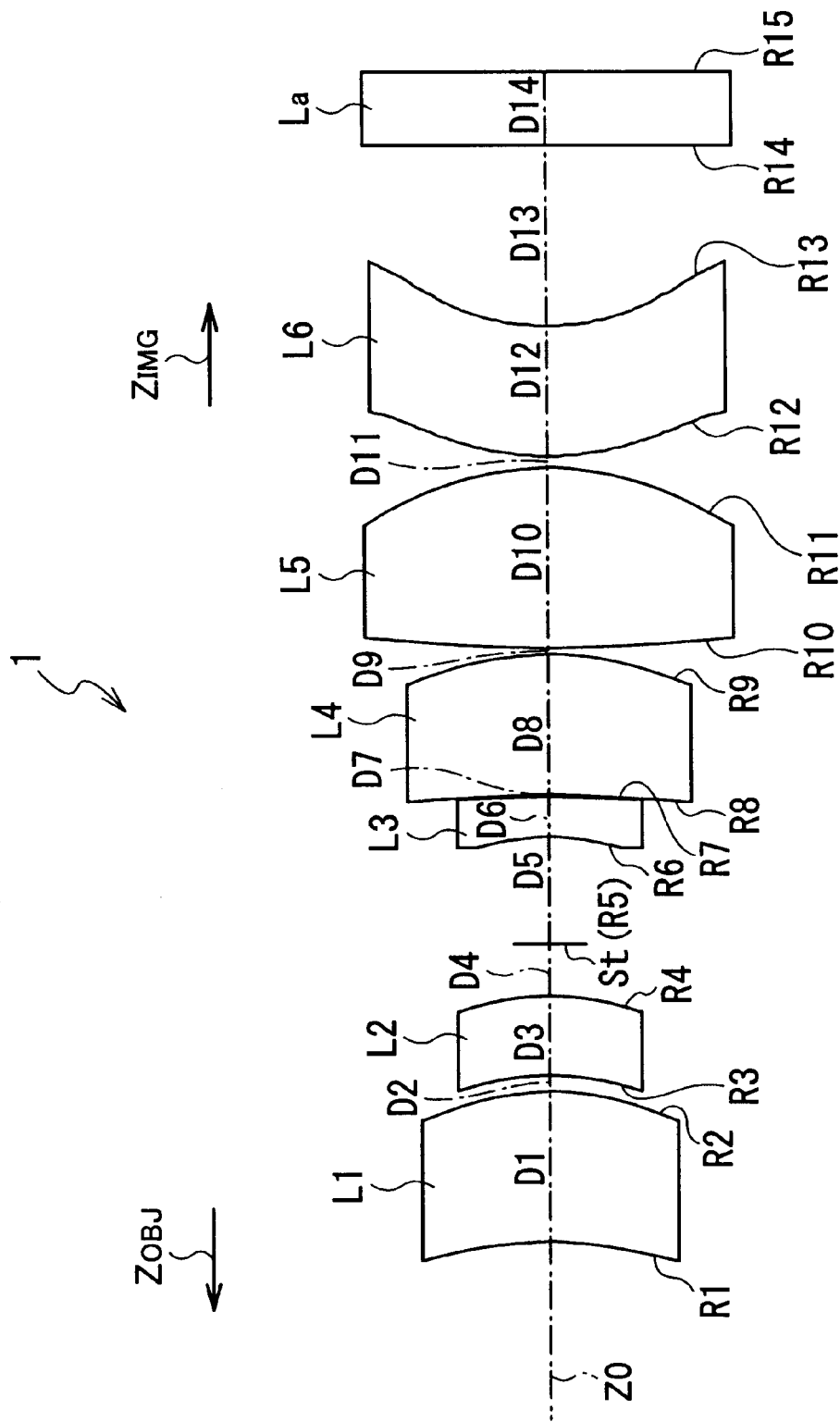
FIG. 1 is a cross sectional view of the configuration of a single-focus lens 1 according to a first embodiment of the invention.

FIG. 1 is a schematic diagram of the configuration of a single-focus lens 1 according to an embodiment of the present invention, showing each lens element in cross section within a single plane which includes an optical axis $Z_0$. In FIG. 1 the side represented by '$Z_{OBJ}$' denotes an object side, i.e., the side where a subject to be imaged is provided, for example, whereas the side represented by '$Z_{IMG}$' denotes an image side, i.e., the side where the subject on the object side is imaged. In FIG. 1 '$R_i$' represents radius of curvature of the ith lens surface and '$D_i$' represents surface separation between the ith lens surface and the [i+1]th lens surface on the optical axis. Note that 'i' is an integer which increments toward the image side, starting with 1 of the closest lens surface to the object side. In FIG. 1 the line represented by 'St' is a stop of the lens system. The single-focus lens 1 of the embodiment is used as an imaging lens of electronic cameras having an image pickup device such as a CCD, for example. An imaging surface of the image pickup device is arranged on the image formation plane of the single-focus lens 1.

As shown in FIG. 1, in the single-focus lens 1 of the embodiment, consecutively provided from the object side are a first lens L1 which is a meniscus lens and has a positive refractive power, directing its concave to the object side; a second lens L2 which is a meniscus lens and has at least one aspheric surface; a third lens L3 which directs its concave to the object side and has a negative refractive power, a fourth lens L4 which directs its convex to the image side and has positive refractive power; a fifth lens L5 which directs its convex to the image side and has a positive refractive power; and a sixth lens L6 which is a meniscus lens and has at least one aspheric surface, directing its concave to the image side. A stop St is disposed between the second lens L2 and the third lens L3.

The single-focus lens 1 further comprises a cover glass La which is disposed on the image side of the sixth lens L6. The cover glass La protects the imaging surface of the image pickup device such as the CCD. The surface of the cover glass La close to the image side is arranged so as to correspond to the image formation plane, for example. In this case, the surface of the cover glass La close to the image side abuts on the imaging surface of the image pickup device.

Figure 7:
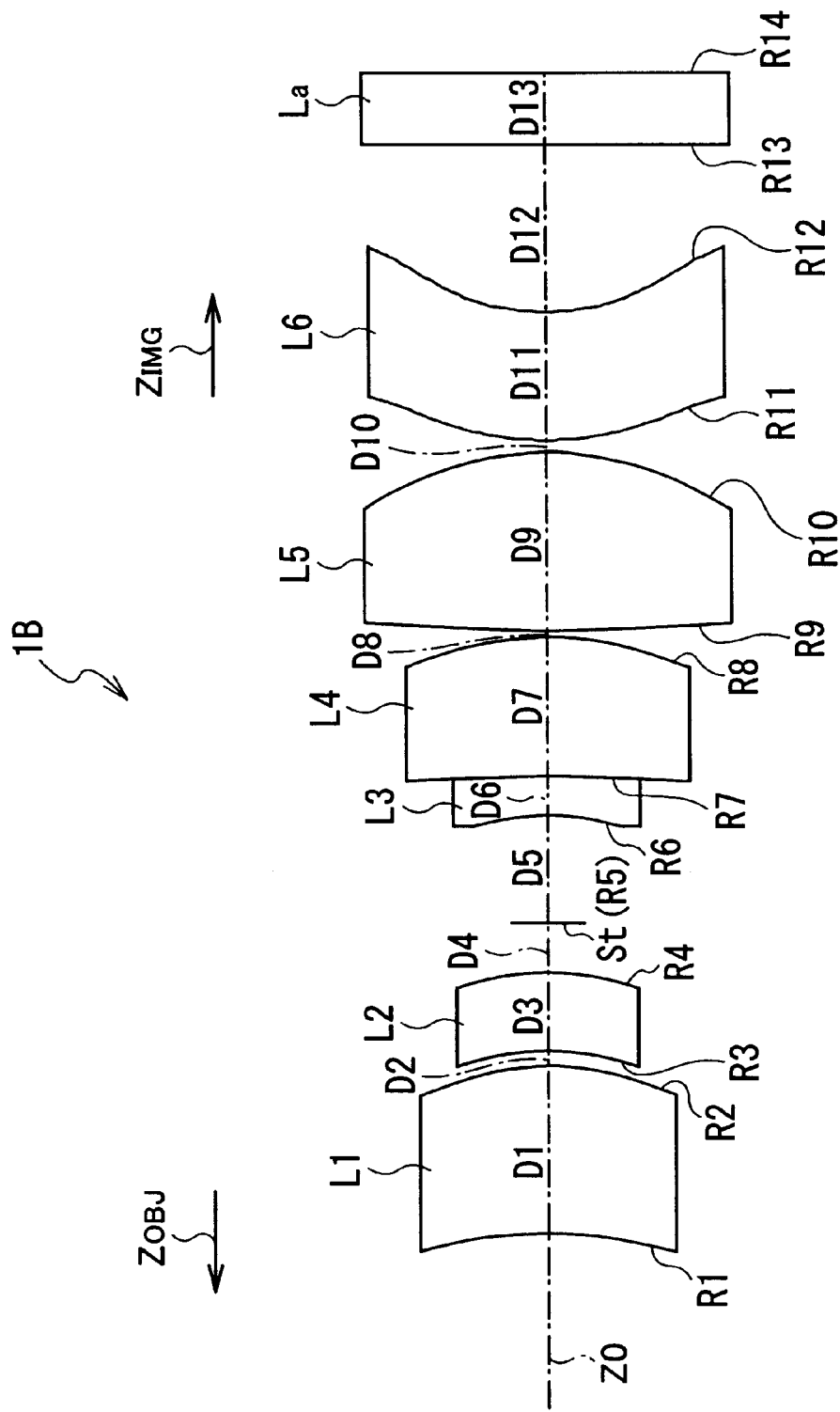
FIG. 7 is a cross sectional view of the configuration of a single-focus lens 1B of a third experimental example (Example 1-3) according to the embodiment of the invention.

According to the configuration of the single-focus lens 1 illustrated in FIG. 1, the third lens L3 and the fourth lens L4 are separated, but the third lens L3 and the fourth lens L4 may be constructed as a cemented lens in which the third lens L3 and the fourth lens L4 are jointed as in a single-focus lens 1B of Example 1-3 to be described later (refer to FIG. 7). According to the single-focus lens 1 shown in FIG. 1, the surface of the fourth lens L4 close to the object side assumes a concave in the vicinity of the optical axis but may assume a convex as in a single-focus lens 1A of Example 1-2 to be described below (refer to FIG. 4). Furthermore, according to the single-focus lens 1, the surface of the fifth lens L5 close to the object side assumes a convex in the vicinity of the optical axis, but may assume a concave as in the single-focus lens 1A of Example 1-2 to be described later.

Mainly taking manufacturability of the aspheric surface into account, desirably the second lens L2 and the sixth lens L6 are made of optical plastic in the single-focus lens 1. Examples of the optical plastic usable for a lens material are acrylic resin, epoxy resin, polycarbonate and the like. For the use of the plastic lens, the optical plastic with low birefringence is considered to exhibit optical performance with high resolution. Therefore, desirably the second lens L2 and the sixth lens L6 are made of acrylic resin having relatively low birefringence.

In the single-focus lens 1 of the embodiment, when 'f' represents overall focal length, and '$f_2$' and '$f_6$' represent focal length of the second lens L2 and the sixth lens L6, respectively, desirably Conditional Expressions (1) and (2) below are satisfied.

$$-0.2 < f/f_2 < 0.2 \tag{1}$$

$$-0.2 < f/f_6 < 0.2 \tag{2}$$

In the single-focus lens 1 of the embodiment, when refractive index of the first lens L1 for a wavelength of d-line (wavelength $\lambda$=587.6 nm) is $Nd_1$, and Abbe number of the first lens L1, the third lens L3 and the fourth lens L4 for the wavelength of d-line are $vd_1, vd_3$ and $vd_4$, respectively, desirably Conditional Expressions (3) to (6) below are satisfied.

$$1.70 < Nd_1 \tag{3}$$

$$35 > vd_1 \tag{4}$$

$$35 > vd_3 \tag{5}$$

$$35 < vd_4 \tag{6}$$

Next, action and effects in terms of optics will be described in regard to the single-focus lens 1 according to the embodiment.

In the single-focus lens 1 of the embodiment, since the first lens L1 is a meniscus lens and its concave is directed to the object side, refractive power of the first lens L1 is low. Thus, particularly distortion and curvature of field are favorably corrected. Further, since the second lens L2 has an aspheric surface, chiefly spherical aberration and coma are favorably corrected. The second lens L2 is disposed posterior to the first lens L1 made of glass. Therefore, even though the second lens L2 is made of optical plastic, its surfaces are free from scratches.

Further, in the single-focus lens 1 of the embodiment, the third lens L3 has a negative refractive power with small Abbe number and large refractive index, and the fourth lens L4 and the fifth lens L5 both have a positive refractive power with large Abbe number and small refractive index, for example, thus chiefly chromatic aberration and curvature of field are preferably corrected. Further, since the sixth lens L6 arranged close to the image plane has an aspheric surface and is a meniscus lens, directing its concave to the image side, particularly distortion and curvature of field are favorably corrected.

Conditional Expressions (1) and (2) restrict the refractive power of the second lens L2 and the sixth lens L6, respectively. Generally, with respect to a lens made of optical plastic, optical performance such as focal length and the like changes due to environmental changes such as changes in temperature or humidity. The larger refractive power of a lens is, the more remarkably optical performance changes. Accordingly, in a case where the second lens L2 and the sixth lens L6 are made of optical plastic, by restricting the refractive power of the lens so as to satisfy Conditional Expressions (1) and (2), deterioration in optical performance due to environmental changes is reduced. If Conditional Expressions (1) and (2) are not satisfied, the refractive power of the second lens L2 and the sixth lens L6 increases and thus the lenses are influenced by temperature or humidity. Consequently, deterioration in optical performance due to environmental changes increases.

Conditional Expressions (3) to (6) restrict optical characteristics of the material of the first lens L1, the third lens L3, the fourth lens L4 and the fifth lens L5, which is not optical plastic but glass, and are mainly related to correction of chromatic aberration. If a glass lens exceeds the range of Conditional Expressions (3) to (6), chiefly it is difficult to correct chromatic aberration.

Hereinafter discussed are differences between the single-focus lens 1 of the embodiment and the single focus-lens proposed in U.S. patent application Ser. No. 09/790,039 (Japanese Unexamined Patent Application Publication No. 2000-062991), still pending.

Figure 11:
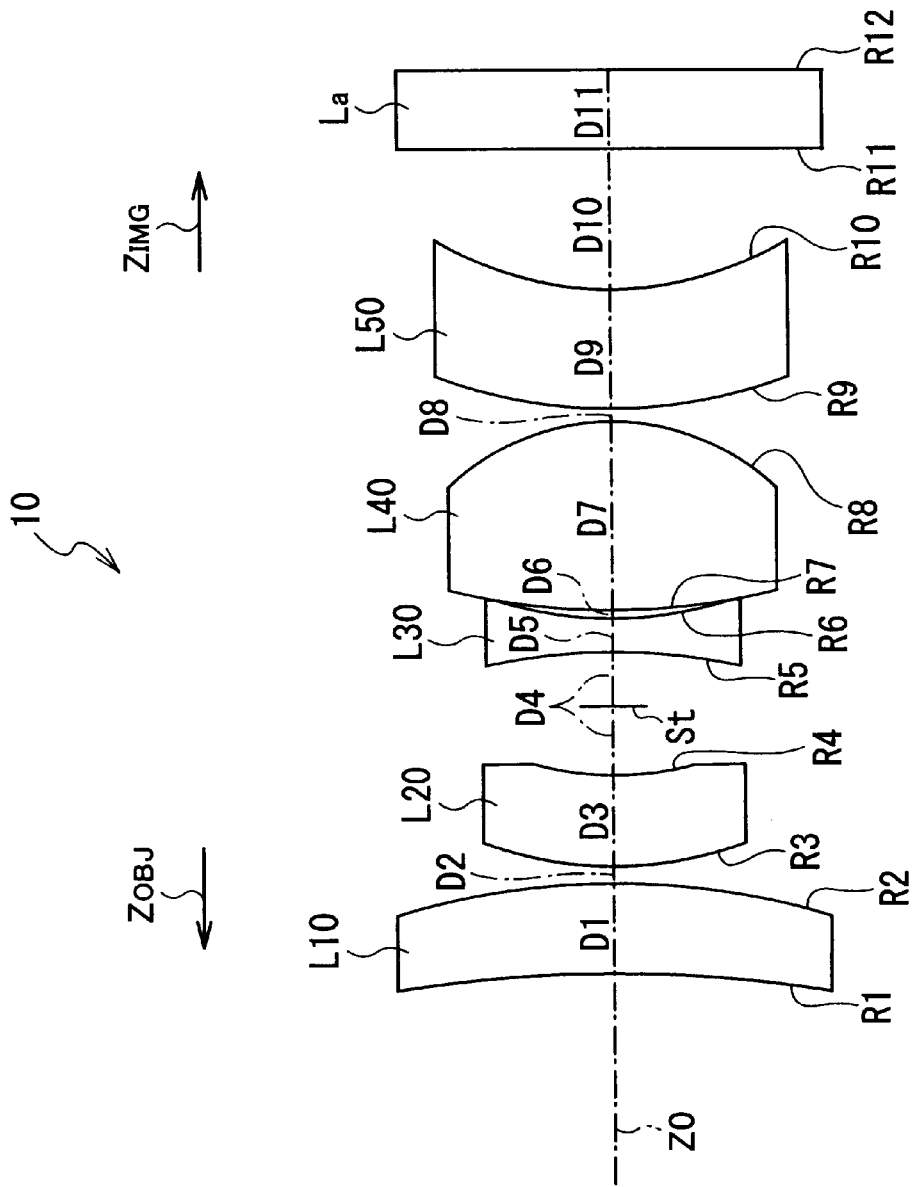
FIG. 11 is a cross sectional view of the configuration of a conventional single-focus lens as a comparative example of the single-focus lens according to the embodiment of the invention.

FIG. 11 shows a single-focus lens proposed in U.S. patent application Ser. No. 09/790,039 (Japanese Unexamined Patent Application Publication No. 2000-062991), still pending. Symbols used in a single-focus lens 10 in FIG. 11 such as 'R' or 'D' denote the same as those used in FIG. 1. According to the single-focus lens 10, a first lens L10 which is a meniscus lens and directs its concave to the object side, a second lens L20 which is a meniscus lens and has at least one aspheric surface, a third lens L30 which is a biconcave lens, a fourth lens L4 which is a biconvex lens, and a fifth lens L50 which is a meniscus lens and has at least one aspheric surface, directing its concave to the image side are provided from the object side in this order.

In terms of configuration, the biggest difference between the single-focus lens 1 of the embodiment and the single-focus lens 10 shown in FIG. 11 lies in the fourth lens L40. According to the single-focus lens 10 shown in FIG. 11, the fourth lens L40 is thick and has relatively small curvature of field. Thus, the single-focus lens 10 requires a relatively complicated spherical surface fabrication technique. The fourth lens L40 of the single focus-lens 10 corresponds to the fourth lens L4 and fifth lens L5 of the single-focus lens 1 of the embodiment. The fourth lens L4 and the fifth lens L5 both have a positive refractive power and the shapes thereof are relatively similar. More specifically, in the fourth lens L4 and the fifth lens L5 of the single-focus lens 1, the power of the fourth lens L40 of the single-focus lens 10 is divided into two, i.e., distributed between the fourth lens L4 and the fifth lens L5. According to the embodiment the fourth lens L40 shown in FIG. 11 is separated into two as described above, whereby the power of the fourth lens L4 and the fifth lens L5 is small compared to that of the fourth lens L40. Accordingly, with regard to the fourth lens L4 and the fifth lens L5, the lens thickness is small and curvature of field is relatively large as compared to those of the fourth lens L40 as in FIG. 11. Thus, according to the single-focus lens 1, the fourth lens L4 and the fifth lens L5 do not require complicated fabrication techniques and are easily manufactured as compared to the single-focus lens 10 as in FIG. 11.

The single-focus lens 1 has one additional lens compared to the single-focus lens 10 as in FIG. 11. The single-focus lens 1, however, has similar power distribution within the entire lens system to that of the single-focus lens 10, thus the overall length of the single-focus lens 1 can be made shorter like the single-focus lens 10.

As described above, according to the single-focus lens 1 of the embodiment, a plurality of lens surfaces is aspheric, so that preferable optical performance with a relatively small number of lenses and a shorter overall length is achieved. Further, the aspheric lenses (the second lens L2 and the sixth lens L6) are made of optical plastic, which facilitates aspheric surface fabrication. Thus, desired optical performance is easily achieved and aspheric surface fabrication is realized at low cost. Furthermore, with regard to the aspheric lens, power is appropriately distributed in consideration of environmental changes. Accordingly, even though the shape or refractive index of the aspheric lens changes due to a temperature change, for example, a change in the overall focal length or the like can be made small. In other words, the degree of deterioration in optical performance due to environmental changes can be made small.

According to the single-focus lens 1 of the embodiment, particularly radius of curvature of the fourth lens L4 and the fifth lens L5 is not unnecessarily small, for example. Therefore, complicated fabrication technique is not required, whereby the single-focus lens 1 is easily fabricated. By implementing the above-mentioned configuration and the conditional expressions, the single-focus lens 1 of the embodiment realizes optimal optical performance as the imaging lens for electronic cameras with a shorter overall length and can be easily fabricated at low cost. Accordingly, the single-focus lens 1 of the embodiment is suitable for mass production.

Examples of the single-focus lens 1 of the embodiment with specific numerical values will be described herein below.

Example 1-1

The configuration in cross section of a single-focus lens of Example 1-1 is the same as that of the single-focus lens 1 as in FIG. 1.

FIGS. 2A and 2B contain specific numeral values of the single-focus lens according to Example 1-1. In FIGS. 2A and 2B, the surface number $S_i$ indicates the sequence of lens surfaces, incrementing toward the image side with the surface closest to the object side being a first lens surface. With regard to the refractive index $Nd_1$ and Abbe number $vd_i$, values at d-line are shown. The '$R_i$' represents radius of curvature of the ith lens surface from the object side similar to the $R_i$ shown in FIG. 1. Similar to the '$D_i$' as in FIG. 1, the '$D_i$' represents surface separation between the ith lens surface $S_i$ and [i+1]th lens surface $S_i$+1 from the object side on the optical axis. The radius of curvature '$R_i$' and the surface separation '$D_i$' are expressed in millimeters. The lens surface having zero (0) radius of curvature '$R_i$' denotes that the surface assumes a plane in FIG. 2A. FIG. 2A also shows values for focal length f(=1.00 mm), F-number (F no.=4.8) and field angle 2ω (=60.6 degrees) in relation to the entire lens system of the single-focus lens.

In FIG. 2A, the surface number marked with the symbol '*' on its left denotes that the lens surface is an aspheric surface. According to Example 1-1, lens surfaces S3 and S4 of the second lens L2 and lens surfaces S12 and S13 of the sixth lens L6 are aspheric surfaces. The second lens L2 and the sixth lens L6 having the aspheric surface are made of poly(methyl methacrylate) (PMMA). With regard to the radius of curvature of these aspheric surfaces, FIG. 2A shows radius of curvature in the vicinity of the optical axis.

FIG. 2B contains aspheric coefficients K, $A_4$, $A_6$, $A_8$ and $A_{10}$ which show the shape of the aspheric lens surfaces S3, S4, S12 and S13. These aspheric coefficients are used in a polynomial equation (A) for aspheric surface below. The polynomial equation (A) describes the shape of an aspheric surface taking the H-axis in a direction orthogonal to the optical axis $Z_0$. In this polynomial equation (A), 'h' denotes the distance (height) from the optical axis $Z_0$ to a lens surface in millimeters and Z(h) denotes the amount of sag of a lens surface at height h. More specifically, Z(h) denotes the length of a perpendicular dropped from a point, which is positioned at a height h from the optical axis $Z_0$ in an aspheric surface, to a tangential plane (a plane perpendicular to the optical axis) at the vertex of the aspheric surface. Z(h) is expressed in millimeters. 'C' denotes a reciprocal (1/R) of paraxial radius of curvature R of a lens surface in the vicinity of the optical axis. 'K' denotes an eccentricity, and $A_4$, $A_6$, $A_8$ and $A_{10}$ denote fourth-order, sixth-order, eighth-order and tenth-order of the aspheric coefficients, respectively. Of the values for the aspheric coefficients in FIG. 2B, 'E±n' indicates the [±n]th power of '10'. The value expressed by 'E±n' is multiplied by the value before 'E'. (1.0E−02) denotes (1.0×10$^{-2}$), for example.

$$Z(h)=Ch^2/\{1+(1-K\cdot C^2\cdot h^2)^{1/2}\}+A_4h^4+A_6h^6+A_8h^8+A_{10}h^{10} \quad (A)$$

FIG. 10 contains values for Conditional Expressions (1) to (6) described above in regard to Example 1-1 and Examples 1-2 and 1-3 to be described later. In the single-focus lens of Example 1-1, $f/f_2$ is −0.003 and $f/f_6$ is 0.006, which satisfies Conditional Expressions (1) and (2). Further, the refractive index $Nd_1$ of the first lens L1 at d-line is 1.84665, which satisfies Conditional Expression (3). The Abbe number $vd_i$ of the first lens L1 at d-line is 23.8; the Abbe number $vd_3$ of the third lens L3 at d-line is 20.9; and the Abbe number $vd_4$ of the fourth lens L4 at d-line is 52.3, which satisfies Conditional Expressions (4) to (6).

FIGS. 3A to 3D are aberration charts of the single-focus lens according to Example 1-1. More specifically, FIGS. 3A, 3B, 3C and 3D show spherical aberration, astigmatism, distortion and chromatic aberration of magnification, respectively. In these aberration charts e-line is employed as a reference and curves indicated with 'g', 'e' and 'C' are aberrations with regard to g-line, e-line and C-line, respectively, wherein wavelengths of g-line, e-line and C-line are 435.8 nm, 546.1 nm and 656.3 nm, respectively. In FIG. 3B the solid line denotes aberration of a sagittal image surface and the broken line denotes aberration of a tangential (meridional) image surface. In the aberration charts 'ω' represents half field angle.

Example 1-2

Next, a second experimental example (Example 1-2) of the single-focus lens 1 according to the embodiment will be described herein below.

Figure 4:
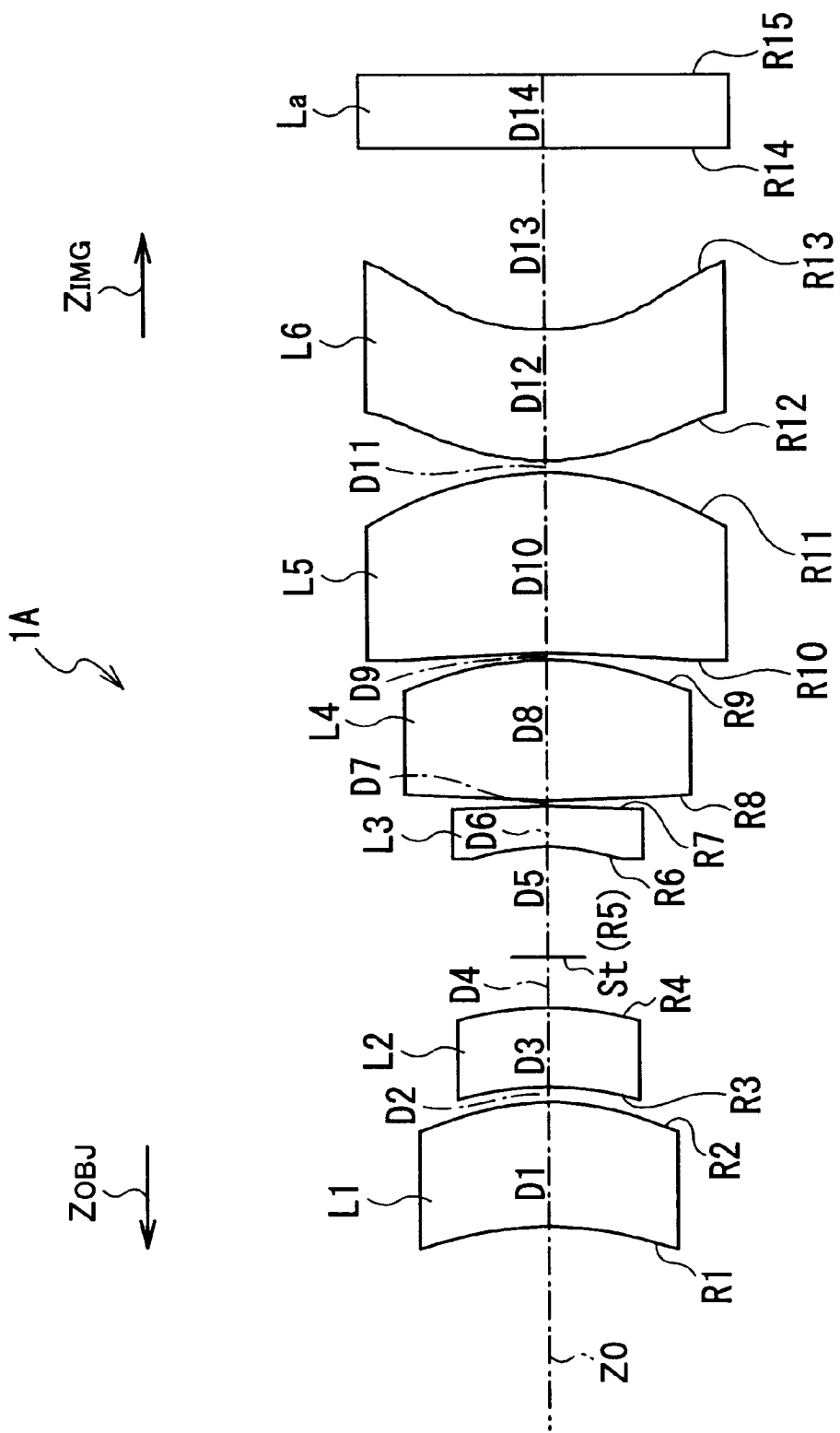
FIG. 4 is a cross sectional view of the configuration of a single-focus lens 1A of a second experimental example (Example 1-2) according to the embodiment of the invention.

FIGS. 5A and 5B contain specific numeral values of the single-focus lens 1A according to Example 1-2. FIG. 4 is a schematic diagram of the configuration of the single-focus lens 1A of Example 1-2 in cross section corresponding to the numeral values in FIGS. 5A and 5B. The symbols used in FIGS. 5A and 5B are the same as those used in FIGS. 2A and 2B (Example 1-1).

In the single-focus lens 1A of Example 1-2, the lens surfaces S3 and S4 of the second lens L2 and the lens surfaces S12 and S13 of the sixth lens L6 are aspheric surfaces as in Example 1-1. The second lens L2 and the sixth lens L6 are made of PMMA.

The biggest difference in the lens configuration between the single-focus lenses of Example 1-1 and Example 1-2 is observed in the fourth lens L4 and the fifth lens L5. In the fourth lens L4 of Example 1-1, the lens surface S8 close to the object side directs its concave to the object side in the vicinity of the optical axis but in Example 1-2 the lens surface S8 directs its convex to the object side in the vicinity of the optical axis. Further, in the fifth lens L5 of Example 1-1, the lens surface S10 close to the object side directs its convex to the object side in the vicinity of the optical axis but in Example 1-2 the lens surface S10 directs its concave to the object side in the vicinity of the optical axis.

In Example 1-2 as shown in FIG. 10, $f/f_2$ is −0.003 and $f/f_6$ is 0.03, which satisfies Conditional Expressions (1) and (2). The refractive index $Nd_1$ of the first lens L1 at d-line is 1.92286, which satisfies Conditional Expression (3). The Abbe number $vd_1$ of the first lens L1 at d-line is 20.9; the Abbe number $vd_3$ of the third lens L3 at d-line is 20.9; and the Abbe number $vd_4$ of the fourth lens L4 at d-line is 52.3, which satisfies Conditional Expressions (4) to (6).

FIGS. 6A to 6D are aberration charts of the single-focus lens 1A according to Example 1-2. More specifically, FIGS. 6A, 6B, 6C and 6D show spherical aberration, astigmatism, distortion and chromatic aberration of magnification, respectively. In FIG. 6B the solid line denotes aberration of a sagittal image surface and the broken line denotes aberration of a tangential image surface. The symbols used in FIGS. 6A to 6D are the same as those used in FIGS. 3A to 3D (Example 1-1).

Example 1-3

Next, a third experimental example (Example 1-3) of the single-focus lens 1 according to the embodiment will be described herein below.

FIGS. 8A and 8B contain specific numeral values for a single-focus lens 1B according to Example 1-3. FIG. 7 is a schematic diagram of the configuration of the single-focus lens 1B of Example 1-3 in cross section corresponding to the numeral values in FIGS. 8A and 8B. The same symbols used in FIGS. 2A and 2B (Example 1-1) are used in FIGS. 8A and 8B.

In the single-focus lens 1B of Example 1-3, the lens surfaces S3 and S4 of the second lens L2 and the lens surfaces S12 and S13 of the sixth lens L6 are aspheric surfaces. The second lens L2 and the sixth lens L6 are made of PMMA.

The biggest difference in the lens configuration between the single-focus lenses of Example 1-1 and Example 1-3 is observed in the constitution of the third lens L3 and the fourth lens L4. In Example 1-1, the third lens L3 and the fourth lens L4 are separated, but in Example 1-3 the third lens L3 and the fourth lens L4 are joined, constituting a cemented lens.

In Example 1-3 as shown in FIG. 10, $f/f_2$ is −0.003 and $f/f_6$ is 0.003, which satisfies Conditional Expressions (1) and (2). The refractive index $N_{d1}$ of the first lens L1 at d-line is 1.84666, which satisfies Conditional Expression (3). The Abbe number $vd_1$ of the first lens L1 at d-line is 23.8; the Abbe number $vd_3$ of the third lens L3 at d-line is 20.9; and the Abbe number $vd_4$ of the fourth lens L4 at d-line is 52.3, which satisfies Conditional Expressions (4) to (6).

FIGS. 9A to 9D are aberration charts of the single-focus lens 1B according to Example 1-3. More specifically, FIGS. 9A, 9B, 9C and 9D show spherical aberration, astigmatism, distortion and chromatic aberration of magnification, respectively. In FIG. 9B the solid line denotes aberration of a sagittal image surface and the broken line denotes aberration of a tangential image surface. Symbols used in FIGS. 9A to 9D are the same as those used in FIGS. 3A to 3D (Example 1-1).

As has been described above, according to the single-focus lenses of all the examples, each of the aforementioned conditional expressions is satisfied and thus the aberrations are preferably corrected. The single-focus lenses exhibit optical performance optimal, e.g., for the imaging lens for electronic cameras.

Second Embodiment

Figure 12:
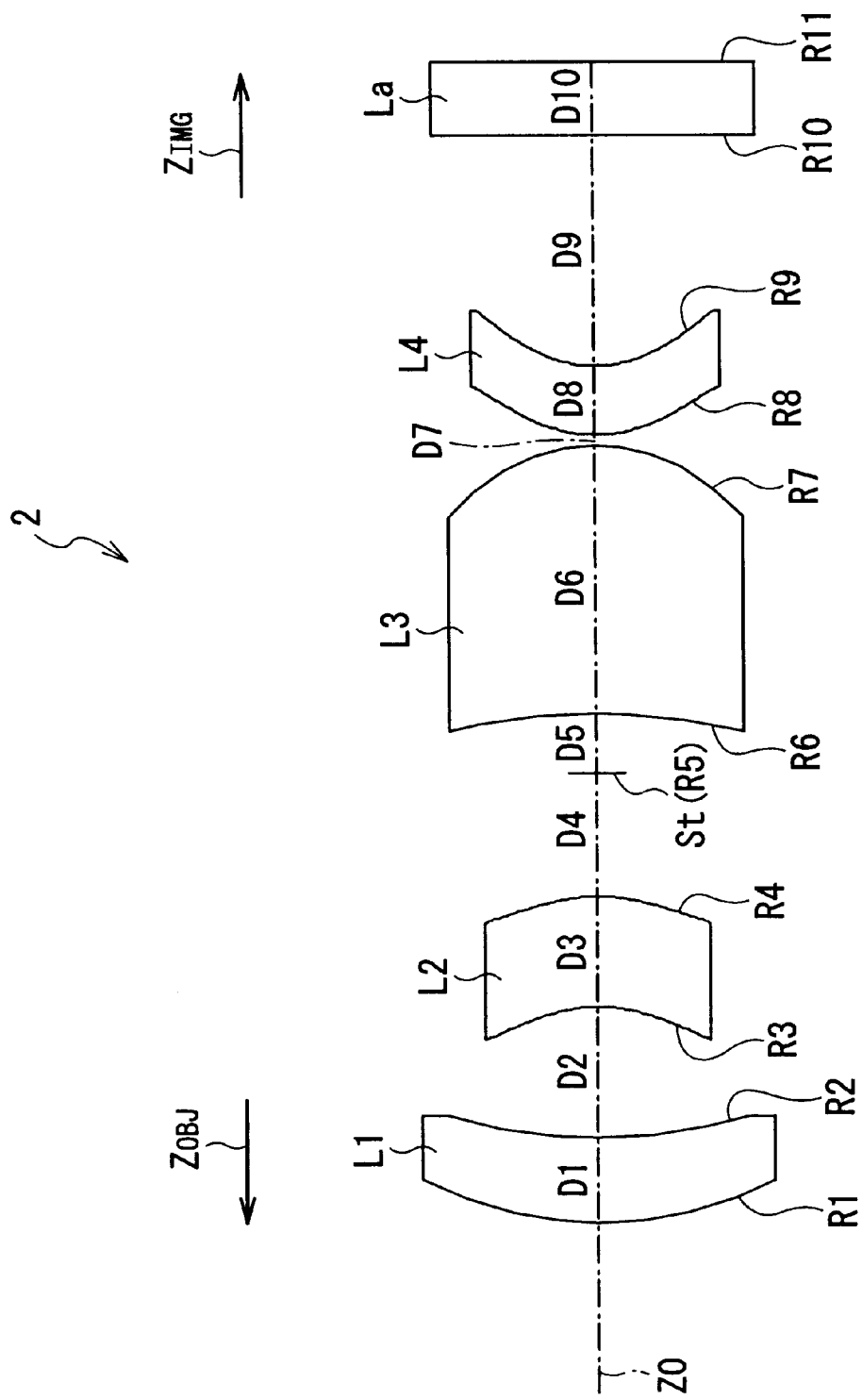
FIG. 12 is a cross sectional view of the configuration of a single-focus lens 2 according to a second embodiment of the invention.

FIG. 12 is a schematic diagram of the configuration of a single-focus lens 2 according to a second embodiment of the present invention, showing each lens element in cross section within a single plane which includes an optical axis $Z_0$. In FIG. 12 the side represented by '$Z_{OBJ}$' denotes an object side, i.e., the side where a subject to be imaged is provided, for example, whereas the side represented by '$Z_{IMG}$' denotes an image side, i.e., the side where the subject on the object side is imaged. In FIG. 12 '$R_i$' represents radius of curvature of the ith lens surface and '$D_i$' represents surface separation between the ith lens surface and the [i+1]th lens surface on the optical axis. Note that 'i' is an integer which increments toward the image side, starting with 1 of the closest lens surface to the object side. In FIG. 12 the line represented by 'St' is a stop of the lens system. The single-focus lens 2 of the second embodiment is used as an imaging lens of electronic cameras having an image pickup device such as a CCD, for example. An imaging surface of the image pickup device is arranged on the image formation plane of the single-focus lens 2.

As shown in FIG. 12, in the single-focus lens 2 of the second embodiment, consecutively provided from the object side are a first lens L1 which has a meniscus shape and has a positive refractive power; a second lens L2 has a meniscus shape and has at least one aspheric surface; a third lens L3 which directs its convex to the image side and has a positive refractive power; and a fourth lens L4 which directs its concave to the image side and has a meniscus shape and at least one aspheric surface. A stop St is disposed between the second lens L2 and the third lens L3. Preferably, the third lens L3 is made of a material having large Abbe number and has a large convex, directing the convex to the image side.

The single-focus lens 2 further comprises a cover glass La which is disposed on the image side of the fourth lens L4. The cover glass La protects the imaging surface of the image pickup device such as the CCD. The surface of the cover glass La close to the image side is arranged to correspond to the image formation plane, for example. In this case, the surface of the cover glass La close to the image side abuts on the imaging surface of the image pickup device.

Mainly taking manufacturability of the aspheric surface into account, desirably the second lens L2 and the fourth lens L4 are made of optical plastic in the single-focus lens 2. Examples of the optical plastic usable for a lens material are acrylic resin, epoxy resin, polycarbonate and the like. For the use of the plastic lens, the optical plastic with low birefringence is considered to exhibit optical performance with high resolution. Therefore, desirably the second lens L2 and the fourth lens L4 are made of acrylic resin having relatively low birefringence.

In the single-focus lens 2, desirably the second lens L2 and the fourth lens L4 have power relatively lower than other lens elements. More specifically, when 'f' represents overall focal length, and '$f_2$' and '$f_4$' represent focal length of the second lens L2 and the fourth lens L4, respectively, desirably Conditional Expressions (11) and (12) below are satisfied.

$$-0.2 < f/f_2 < 0.2 \quad (11)$$

$$-0.2 < f/f_4 < 0.2 \quad (12)$$

In the single-focus lens 2 of the second embodiment, when refractive index of the first lens L1 for a wavelength of d-line (wavelength $\lambda = 587.6$ nm) is $Nd_1$, and Abbe number of the first lens L1 and the third lens L3 for the wavelength of d-line are $vd_1$ and $vd_3$, respectively, desirably Conditional Expressions (13) to (15) below are satisfied.

$$1.70 < Nd_1 \quad (13)$$

$$35 > vd_1 \quad (14)$$

$$50 < vd_3 \quad (15)$$

Next, action and effects in terms of optics will be described in regard to the single-focus lens 2 according to the second embodiment.

In the single-focus lens 2 of the second embodiment, since the second lens L2 has an aspheric surface, chiefly spherical aberration and coma are favorably corrected. The second lens L2 is disposed posterior to the first lens L1 made of glass. Therefore, even though the second lens L2 is made of optical plastic, its surfaces are free from scratches.

Further, in the single-focus lens 2 of the second embodiment, provision of the positive third lens L3 which directs its large convex to the image side and is made of a material having large Abbe number causes mainly chromatic aberration and curvature of field to be favorably corrected. Further, the fourth lens L4 having an aspheric surface and a meniscus shape and directing its concave to the image side is provided close to the image side in the single focus lens 2. Thus, particularly distortion and curvature of field are favorably corrected.

Conditional Expressions (11) and (12) restrict the refractive power of the second lens L2 and the fourth lens L4, respectively. Generally, with respect to a lens made of optical plastic, optical performance such as focal length and the like changes due to environmental changes such as changes in temperature or humidity. The larger refractive power of a lens is, the more remarkably optical performance changes. Accordingly, in a case where the second lens L2 and the fourth lens L4 are made of optical plastic, by restricting the refractive power of the lens to satisfy Conditional Expressions (11) and (12), deterioration in optical performance due to environmental changes is reduced. If Conditional Expressions (11) and (12) are not satisfied, the refractive power of the second lens L2 and the fourth lens L4 increases and thus the lenses are influenced by temperature or humidity. Consequently, deterioration in optical performance due to environmental changes increases.

Conditional Expressions (13) to (15) restrict optical characteristics of the material of the first lens L1 and the third lens L3, which is not optical plastic but glass, and are mainly related to correction of chromatic aberration. If a glass lens exceeds the range of Conditional Expressions (13) to (15), chiefly correction of chromatic aberration is difficult.

As described above, according to the single-focus lens 2 of the second embodiment, a plurality of lens surfaces is aspheric, so that preferable optical performance is realized with a very small number of lenses, four lenses, and a shorter overall length. Further, the aspheric lenses (the second lens L2 and the fourth lens L4) are made of optical plastic, which facilitates aspheric surface fabrication. Thus, desired optical performance is easily achieved and aspheric surface fabrication is realized at low cost. Furthermore, with regard to the aspheric lens, power is appropriately distributed in consideration of environmental changes. Accordingly, even though the shape or refractive index of the aspheric lens changes due to a temperature change, for example, a change in the overall focal length or the like can be made small. In other words, the degree of deterioration in optical performance due to environmental changes can be made small.

As has been described, by implementing the above-mentioned configuration and the conditional expressions, the single-focus lens 2 of the second embodiment realizes optimal optical performance as the imaging lens, for example, for electronic cameras with a shorter overall length and can be easily fabricated at low cost.

Examples of the single-focus lens 2 of the second embodiment with specific numerical values will be described herein below.

Example 2-1

The configuration in cross section of a single-focus lens of Example 2-1 is the same as that of the single-focus lens 2 as in FIG. 12.

FIGS. 13A and 13B contain specific numeral values of the single-focus lens according to Example 2-1. In FIGS. 13A and 13B, the surface number $S_i$ indicates the sequence of lens surfaces, incrementing toward the image side with the surface closest to the object side being a first lens surface. With regard to the refractive index $Nd_1$ and Abbe number $vd_j$, values at d-line are shown. The '$R_i$' represents radius of curvature of the ith lens surface from the object side similar to the $R_i$ shown in FIG. 12. Similar to the '$D_i$' as in FIG. 12, the '$D_i$' represents surface separation between the ith lens surface $S_i$ and [i+1]th lens surface $S_i$+1 from the object side on the optical axis. The radius of curvature '$R_i$' and the surface separation '$D_i$' are expressed in millimeters. The lens surface having zero (0) radius of curvature '$R_i$' denotes that the surface assumes a plane in FIG. 13A. FIG. 13A also shows values for focal length f (=1.00 mm), F-number (F no.=5.6) and field angle 2ω (=51.0 degrees) in relation to the entire lens system of the single-focus lens.

In FIG. 13A, the surface number marked with the symbol '*' on its left denotes that the lens surface is an aspheric surface. According to Example 2-1, lens surfaces S3 and S4 of the second lens L2 and lens surfaces S8 and S9 of the fourth lens L4 are aspheric surfaces. The second lens L2 and the fourth lens L4 having the aspheric surface are made of poly(methyl methacrylate) (PMMA). With regard to the radius of curvature of these aspheric surfaces, FIG. 13A shows radius of curvature in the vicinity of the optical axis.

FIG. 13B contains aspheric coefficients K, $A_4$, $A_6$, $A_8$ and $A_{10}$ which show the shape of the aspheric lens surfaces S3, S4, S8 and S9. These aspheric coefficients are used in a polynomial equation (A) for aspheric surface below. The polynomial equation (A) describes the shape of an aspheric surface taking the H-axis in a direction orthogonal to the optical axis $Z_0$. In this polynomial equation (A), 'h' denotes the distance (height) from the optical axis $Z_0$ to a lens surface in millimeters and Z(h) denotes the amount of sag of a lens surface at height h. More specifically, Z(h) denotes the length of a perpendicular dropped from a point, which is positioned at a height h from the optical axis $Z_0$ in an aspheric surface, to a tangential plane (a plane perpendicular to the optical axis) at the vertex of the aspheric surface. Z(h) is expressed in millimeters. 'C' denotes a reciprocal (1/R) of paraxial radius of curvature R of a lens surface in the vicinity of the optical axis. 'K' denotes an eccentricity, and $A_4$, $A_6$, $A_8$ and $A_{10}$ denote fourth-order, sixth-order, eighth-order and tenth-order of the aspheric coefficients, respectively. Of the values for the aspheric coefficients in FIG. 13B, 'E±n' indicates the [±n]th power of '10'. The value expressed by 'E±n' is multiplied by the value before 'E'. (1.0 E−02) denotes (1.0×10$^{-2}$), for example.

$$Z(h)=Ch^2/\{1+(1-K\cdot C^2\cdot h^2)^{1/2}\}+A_4h^4+A_6h^6+A_8h^8+A_{10}h^{10} \quad (A)$$

FIG. 21 contains values for Conditional Expressions (11) to (15) described above in regard to Example 2-1 and Examples 2-2 and 2-3 to be described later. In the single-focus lens of Example 2-1, $f/f_2$ is −0.012 and $f/f_4$ is 0.014, which satisfies Conditional Expressions (11) and (12). Further, the refractive index $Nd_1$ of the first lens L1 at d-line is 1.84666, which satisfies Conditional Expression (13). The Abbe number $vd_1$ of the first lens L1 at d-line is 23.8; and the Abbe number $vd_3$ of the third lens L3 at d-line is 58.1, which satisfies Conditional Expressions (14) to (15).

FIGS. 14A to 14D are aberration charts of the single-focus lens according to Example 2-1. More specifically, FIGS. 14A, 14B, 14C and 14D show spherical aberration, astigmatism, distortion and chromatic aberration of magnification, respectively. In these aberration charts e-line is employed as a reference and curves indicated with 'g', 'e' and 'C' are aberrations with regard to g-line, e-line and C-line, respectively, wherein wavelengths of g-line, e-line and C-line are 435.8 nm, 546.1 nm and 656.3 nm, respectively. In FIG. 14B the solid line denotes aberration of a sagittal image surface and the broken line denotes aberration of a tangential (meridional) image surface. In the aberration charts ω represents half field angle.

Example 2-2

Next, a second experimental example (Example 2-2) of the single-focus lens 2 according to the second embodiment will be described herein below.

Figure 15:
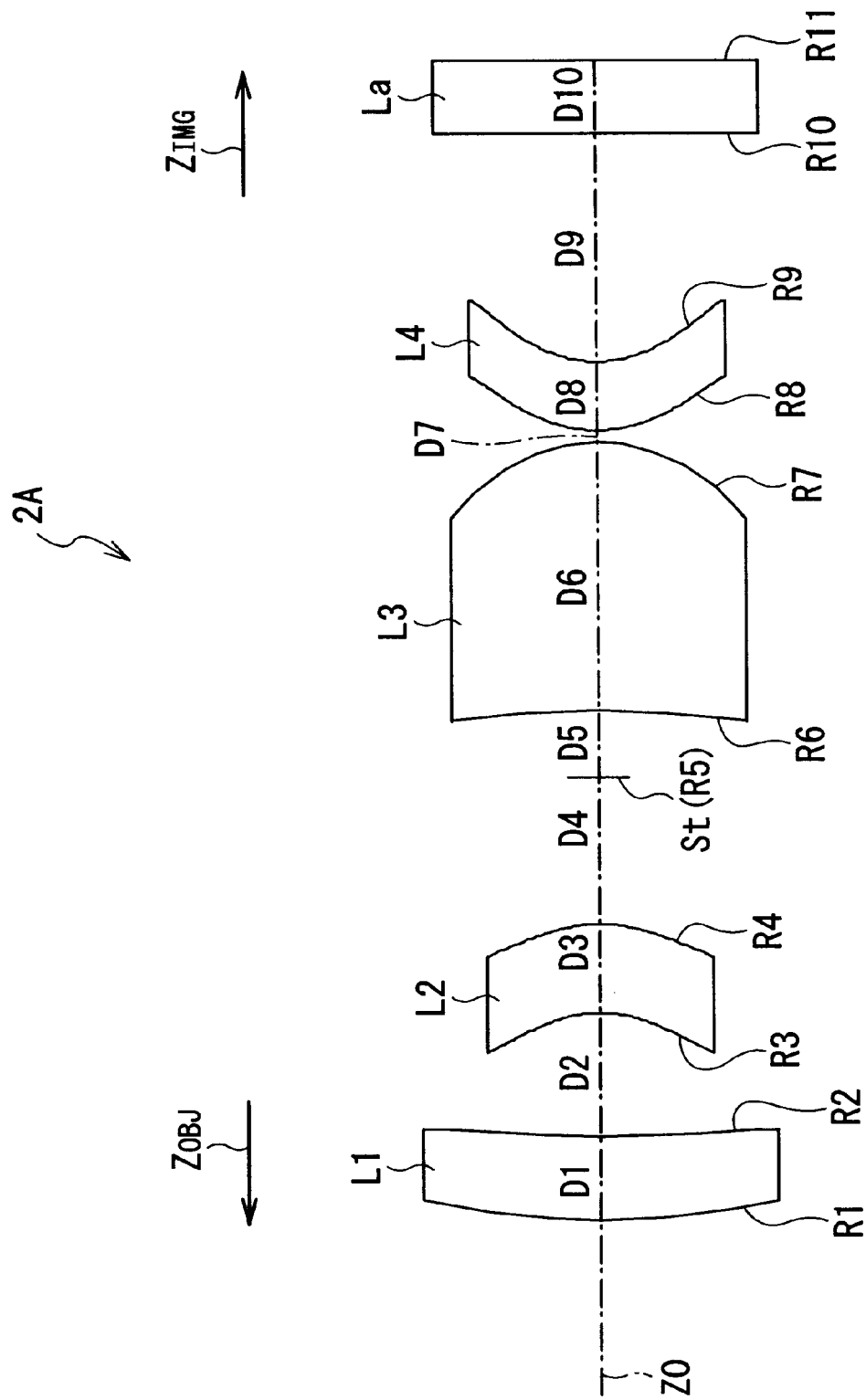
FIG. 15 is a cross sectional view of the configuration of a single-focus lens 2A of a second experimental example (Example 2-2) according to the second embodiment of the invention.

FIGS. 16A and 16B contain specific numeral values of the single-focus lens 2A according to Example 2-2. FIG. 15 is a schematic diagram of the configuration of the single-focus lens 2A of Example 2-2 in cross section corresponding to the numeral values in FIGS. 16A and 16B. The symbols used in FIGS. 16A and 16B are the same as those used in FIGS. 13A and 13B (Example 2-1).

In the single-focus lens 2A of Example 2-2, the lens surfaces S3 and S4 of the second lens L2 and the lens surfaces S8 and S9 of the fourth lens L4 are aspheric surfaces as in Example 2-1. The second lens L2 and the fourth lens L4 are made of PMMA.

In Example 2-2 as shown in FIG. 21, $f/f_2$ is 0.001 and $f/f_4$ is 0.040, which satisfies Conditional Expressions (11) and (12). The refractive index $Nd_1$ of the first lens L1 at d-line is 1.84666, which satisfies Conditional Expression (13). The Abbe number $vd_1$ of the first lens L1 at d-line is 23.8; and the Abbe number $vd_3$ of the third lens L3 at d-line is 81.6, which satisfies Conditional Expressions (14) and (15).

FIGS. 17A to 17D are aberration charts of the single-focus lens 2A according to Example 2-2. More specifically, FIGS. 17A, 17B, 17C and 17D show spherical aberration, astigmatism, distortion and chromatic aberration of magnification, respectively. In FIG. 17B the solid line denotes aberration of a sagittal image surface and the broken line denotes aberration of a tangential image surface. The symbols used in FIGS. 17A to 17D are the same as those used in FIGS. 14A to 14D (Example 2-1).

Example 2-3

Next, a third experimental example (Example 2-3) of the single-focus lens 2 according to the second embodiment will be described herein below.

Figure 18:
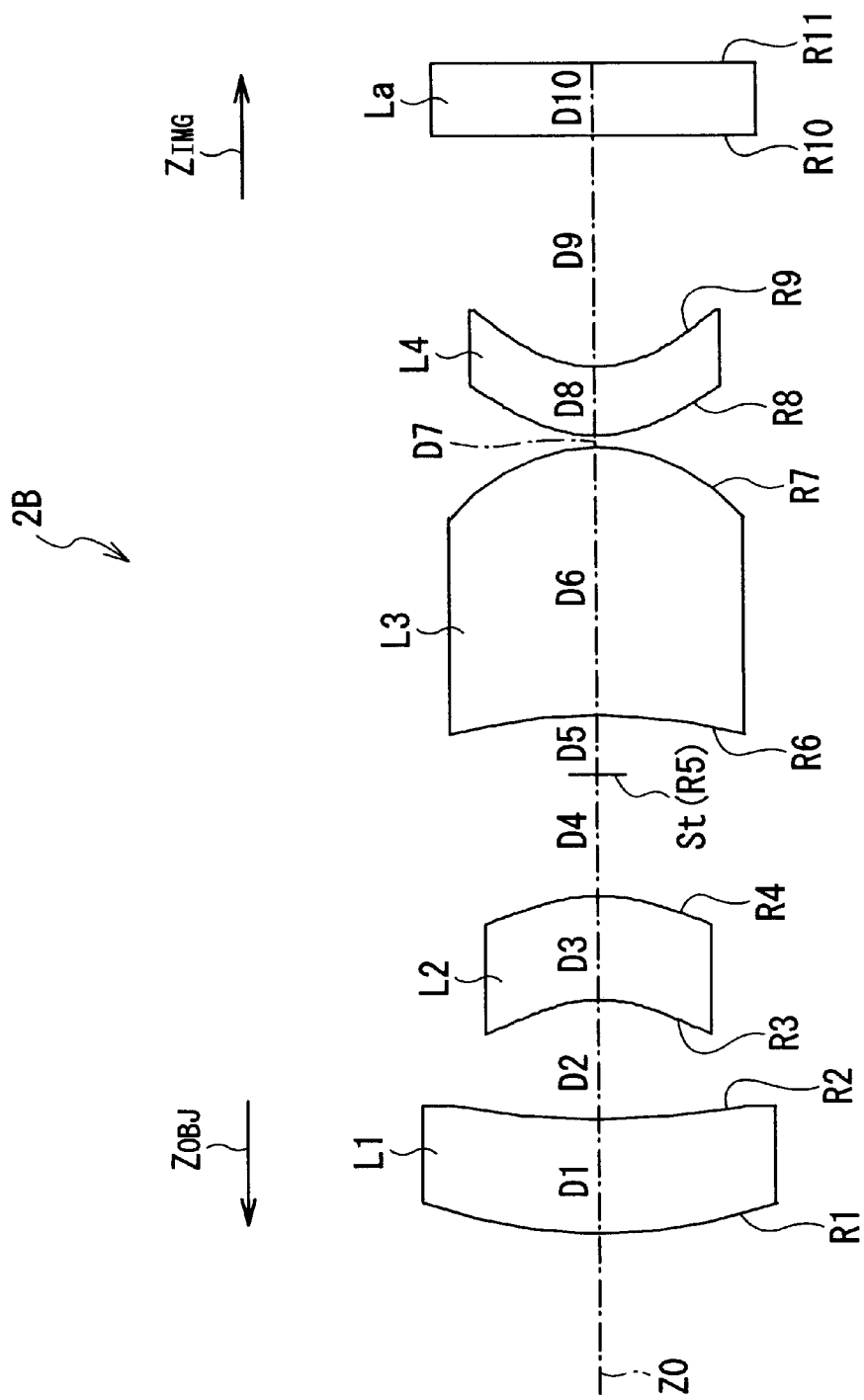
FIG. 18 is a cross sectional view of the configuration of a single-focus lens 2B of a third experimental example (Example 2-3) according to the second embodiment of the invention.

FIGS. 19A and 19B contain specific numeral values for a single-focus lens 2B according to Example 2-3. FIG. 18 is a schematic diagram of the configuration of the single-focus lens 2B of Example 2-3 in cross section corresponding to the numeral values in FIGS. 19A and 19B. The same symbols used in FIGS. 13A and 13B (Example 2-1) are used in FIGS. 19A and 19B.

In the single-focus lens 2B of Example 2-3, the lens surfaces S3 and S4 of the second lens L2 and the lens surfaces S8 and S9 of the fourth lens L4 are aspheric surfaces. The second lens L2 and the fourth lens L4 are made of PMMA.

In Example 2-3 as shown in FIG. 21, $f/f_2$ is −0.015 and $f/f_4$ is 0.018, which satisfies Conditional Expressions (11) and (12). The refractive index $Nd_1$ of the first lens L1 at d-line is 1.92286, which satisfies Conditional Expression (13). The Abbe number $vd_1$ of the first lens L1 at d-line is 20.9; and the Abbe number $vd_3$ of the third lens L3 at d-line is 58.1, which satisfies Conditional Expressions (14) and (16).

FIGS. 20A to 20D are aberration charts of the single-focus lens 2B according to Example 2-3. More specifically, FIGS. 20A, 20B, 20C and 20D show spherical aberration, astigmatism, distortion and chromatic aberration of magnification, respectively. In FIG. 20B the solid line denotes aberration of a sagittal image surface and the broken line denotes aberration of a tangential image surface. Symbols used in FIGS. 20A to 20D are the same as those used in FIGS. 14A to 14D (Example 2-1).

As has been described above, according to the single-focus lenses of all the examples of the second embodiment, each of the aforementioned conditional expressions is satisfied and thus the aberrations are preferably corrected. The single-focus lenses exhibit optical performance optimal, e.g., for the imaging lens for electronic cameras.

The present invention is not limited to the above embodiments and various modifications are possible. For example, the radius of curvature R, the surface separation D, the refractive index N and the Abbe number v, which are lens elements, are not limited to the values shown in the above examples but may take other values.

The present invention is not only usable in the imaging lens for the electronic camera but also in an imaging lens for a camera using silver-salt films and so on.

As has been described herein before, according to the single-focus lens of the first aspect of the invention, consecutively arranged from the object side are the first lens having a meniscus shape and a positive refractive power, the first lens directing its concave to the object side, the second lens having a meniscus shape and including at least one aspheric surface, the third lens directing its concave to the object side and having a negative refractive power, the fourth lens directing its convex to the image side and having a positive refractive power, the fifth lens directing its convex to the image side and having a positive refractive power and the sixth lens having a meniscus shape, including at least one aspheric surface, and directing its concave to the image side. This configuration allows the single-focus lens to have a shorter overall length and exhibit optimal optical performance chiefly for imaging lenses. Furthermore, the single-focus lens does not require a complicated fabrication technique, thus is easily fabricated.

According to the single-focus lens of the first aspect of the invention, the second lens and the sixth lens having aspheric surfaces are made of optical plastic, so that the aspheric surface is easily fabricated. Thus, desired optical performance is easily obtained at low cost.

According to the single-focus lens of the first aspect of the invention, the second lens and the sixth lens, which are made of optical plastic, satisfy the conditional expressions $-0.2<f/f_2<0.2$ and $-0.2<f/f_6<0.2$, respectively. Thus, the refractive power of the second lens and the sixth lens is limited to be relatively low. As a result, deterioration in optical performance due to environmental changes such as changes in temperature or humidity is reduced.

According to the single-focus lens of the second aspect of the invention, consecutively arranged from the object side are the first lens having a meniscus shape and a positive refractive power, the second lens having a meniscus shape and having at least one aspheric surface, the third lens directing its convex to the image side and having a positive refractive power, and the fourth lens having a meniscus shape, including at least one aspheric surface and directing its concave to the image side. This configuration allows the single-focus lens to exhibit optimal optical performance chiefly for imaging lenses and to be fabricated at low cost with a small number of lenses and a shorter overall length.

According to the single-focus lens of the second aspect of the invention, the second lens and the fourth lens having aspheric surfaces are made of optical plastic, so that the aspheric surface is easily fabricated. Thus, desired optical performance is easily obtained at low cost.

According to the single-focus lens of the second aspect of the invention, the second lens and the fourth lens, which are made of optical plastic, satisfy the conditional expressions $-0.2<f/f_2<0.2$ and $-0.2<f/f_4<0.2$, respectively. Thus, the refractive power of the second lens and the fourth lens is limited to relatively low. As a result, deterioration in optical performance due to environmental changes such as changes in temperature or humidity is reduced.

Obviously, many modifications and variations of the present invention are possible in the light of the above teachings. It is therefore to be understood that within the scope of the appended claims the invention may be practiced otherwise than as specifically described.

What is claimed is:

1. A single-focus lens, comprising: consecutively from an object side, a first lens having a meniscus shape and a positive refractive power, the first lens directing its concave surface to the object side;

a second lens having a meniscus shape and including at least one aspheric surface;

a third lens directing its concave surface to the object side and having a negative refractive power;

a fourth lens directing its convex surface to an image side and having a positive refractive power;

a fifth lens directing its convex surface to the image side and having a positive refractive power; and a sixth lens having a meniscus shape, including at least one aspheric surface, and directing its concave surface to the image side.

2. A single-focus lens according to claim 1, wherein the second lens and the sixth lens are made of optical plastic.

3. A single-focus lens according to claim 2, wherein conditional expressions (1) and (2) below are satisfied $$-0.2<f/f_2<0.2 \qquad (1)$$

$$-0.2<f/f_6<0.2 \qquad (2)$$

where the f represents an overall focal length; the $f_2$ represents a focal length of the second lens; and the $f_6$ represents a focal length of the sixth lens.

4. A single-focus lens according to claim 1, wherein conditional expressions (3), (4), (5) and (6) below are satisfied $$1.70<Nd_1 \qquad (3)$$

$$35>vd_1 \qquad (4)$$

$$35>vd_3 \qquad (5)$$

$$35<vd_4 \qquad (6)$$

where the $Nd_1$ represents refractive index of the first lens for a wavelength of d-line, the $vd_1$ represents Abbe number of the first lens for the wavelength of d-line, the $vd_3$ represents Abbe number of the third lens for the wavelength of d-line, and the $vd_4$ represents Abbe number of the fourth lens of the wavelength of d-line.

5. A single-focus lens according to claim 2, wherein conditional expressions (3), (4), (5) and (6) below are satisfied $$1.70 < Nd_1 \quad (3)$$

$$35 > vd_1 \quad (4)$$

$$35 > vd_3 \quad (5)$$

$$35 < vd_4 \quad (6)$$

where the $Nd_1$ represents refractive index of the first lens for a wavelength of d-line, the $vd_1$ represents Abbe number of the first lens for the wavelength of d-line, the $vd_3$ represents Abbe number of the third lens for the wavelength of d-line, and the $vd_4$ represents Abbe number of the fourth lens of the wavelength of d-line.

6. A single-focus lens according to claim 3, wherein conditional expressions (3), (4), (5) and (6) below are satisfied $$1.70 < Nd_1 \quad (3)$$

$$35 > vd_1 \quad (4)$$

$$35 > vd_3 \quad (5)$$

$$35 < vd_4 \quad (6)$$

where the $Nd_1$ represents refractive index of the first lens for a wavelength of d-line, the $vd_1$ represents Abbe number of the first lens for the wavelength of d-line, the $vd_3$ represents Abbe number of the third lens for the wavelength of d-line, and the $vd_4$ represents Abbe number of the fourth lens of the wavelength of d-line.

7. A single-focus lens consisting of: consecutively from an object side,
   a first lens having a meniscus shape and a positive refractive power;
   a second lens having a meniscus shape and including at least one aspheric surface;
   a third lens directing its convex surface to an image side and having a positive refractive power; and
   a fourth lens having a meniscus shape, including at least one aspheric surface, and directing its concave surface to the image side.

8. A single-focus lens according to claim 7, wherein the second lens and the fourth lens are made of optical plastic.

9. A single-focus lens according to claim 8, wherein conditional expressions (11) and (12) below are satisfied $$-0.2 < f/f_2 < 0.2 \quad (11)$$

$$-0.2 < f/f_4 < 0.2 \quad (12)$$

where the f represents an overall focal length; the $f_2$ represents a focal length of the second lens; and the $f_4$ represents a focal length of the fourth lens.

10. A single-focus lens according to claim 7, wherein conditional expressions (13), (14) and (15) below are satisfied $$1.70 < Nd_1 \quad (13)$$

$$35 > vd_1 \quad (14)$$

$$50 < vd_3 \quad (15)$$

where the $Nd_1$ represents refractive index of the first lens for a wavelength of d-line, the $vd_1$ represents Abbe number of the first lens for the wavelength of d-line and the $vd_3$ represents Abbe number of the third lens for the wavelength of d-line.

11. A single-focus lens according to claim 8, wherein conditional expressions (13), (14) and (15) below are satisfied $$1.70 < Nd_1 \quad (13)$$

$$35 > vd_1 \quad (14)$$

$$50 < vd_3 \quad (15)$$

where the $Nd_1$ represents refractive index of the first lens for a wavelength of d-line, the $vd_1$ represents Abbe number of the first lens for the wavelength of d-line and the $vd_3$ represents Abbe number of the third lens for the wavelength of d-line.

12. A single-focus lens according to claim 9, wherein conditional expressions (13), (14) and (15) below are satisfied $$1.70 < Nd_1 \quad (13)$$

$$35 > vd_1 \quad (14)$$

$$50 < vd_3 \quad (15)$$

where the $Nd_1$ represents refractive index of the first lens for a wavelength of d-line, the $vd_1$ represents Abbe number of the first lens for the wavelength of d-line and the $vd_3$ represents Abbe number of the third lens for the wavelength of d-line.

13. A single-focus lens according to claim 7, wherein both surfaces of the third lens are spherical surfaces.

14. A single-focus lens, comprising: consecutively from an object side,
    a first lens having a meniscus shape and a positive refractive power;
    a second lens having a meniscus shape and including at least one aspheric surface;
    a third lens directing its convex surface to an image side and having a positive refractive power; and
    a fourth lens having a meniscus shape, including at least one aspheric surface, and directing its concave surface to the image side, wherein conditional expressions (13), (14) and (15) below are satisfied $$1.70 < Nd_1 \quad (13)$$

$$35 > vd_1 \quad (14)$$

$$50 > vd_3 \quad (15)$$

where the $Nd_1$ represents refractive index of the first lens for a wavelength of d-line, the $vd_1$ represents Abbe number of the first lens for the wavelength of d-line and the $vd_3$ represents Abbe number of the third lens for the wavelength of d-line.

15. A single-focus lens, comprising: consecutively from an object side,
    a first lens having a meniscus shape and a positive refractive power;

a second lens having a meniscus shape and including at least one aspheric surface;

a third lens directing its convex surface to an image side and having a positive refractive power; and a fourth lens having a meniscus shape, including at least one aspheric surface, and directing its concave surface to the image side, and wherein the second lens and the fourth lens are made of optical plastic and conditional expressions (13), (14) and (15) below are satisfied $$1.70 < Nd_1 \tag{13}$$

$$35 > vd_1 \tag{14}$$

$$50 < vd_3 \tag{15}$$

where the $Nd_1$ represents refractive index of the first lens for a wavelength of d-line, the $vd_1$ represents Abbe number of the first lens for the wavelength of d-line and the $vd_3$ represents Abbe number of the third lens for the wavelength of d-line.

16. A single-focus lens, comprising: consecutively from an object side, a first lens having a meniscus shape and a positive refractive power;

a second lens having a meniscus shape and including at least one aspheric surface;

a third lens directing its convex surface to an image side and having a positive refractive power; and a fourth lens having a meniscus shape, including at least one aspheric surface, and directing its concave surface to the image side, and wherein conditional expressions (11) and (12) below are satisfied $$-0.2 < f/f_2 < 0.2 \tag{11}$$

$$-0.2 < f/f_4 < 0.2 \tag{12}$$

where the f represents an overall focal length; the $f_2$ represents a focal length of the second lens; and the $f_4$ represents a focal length of the fourth lens; and wherein conditional expressions (13), (14) and (15) below are satisfied $$1.70 < Nd_1 \tag{13}$$

$$35 > vd_1 \tag{14}$$

$$50 < vd_3 \tag{15}$$

wherein the $Nd_1$ represents refractive index of the first lens for a wavelength of d-line, the $vd_1$ represents the Abbe number of the first lens for the wavelength of d-line and the $vd_3$ represents Abbe number of the third lens for the wavelength of d-line.

* * * * *